United States Patent
Iyoob et al.

(10) Patent No.: US 11,574,186 B2
(45) Date of Patent: Feb. 7, 2023

(54) COGNITIVE DATA PSEUDONYMIZATION

(71) Applicant: International Business Machines Corporation, Armonk, NY (US)

(72) Inventors: Ilyas Mohamed Iyoob, Pflugerville, TX (US); Krishna Teja Rekapalli, Austin, TX (US); Aly Megahed, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 663 days.

(21) Appl. No.: 16/669,894

(22) Filed: Oct. 31, 2019

(65) Prior Publication Data

US 2021/0133557 A1    May 6, 2021

(51) Int. Cl.
*G06N 3/08*    (2006.01)
*G06N 3/04*    (2006.01)
(Continued)

(52) U.S. Cl.
CPC .......... *G06N 3/08* (2013.01); *G06F 21/6245* (2013.01); *G06F 40/205* (2020.01); *G06K 9/6267* (2013.01); *G06N 3/0445* (2013.01)

(58) Field of Classification Search
CPC .................... G06F 21/6254; G06Q 30/02
(Continued)

(56) References Cited

U.S. PATENT DOCUMENTS 9,349,026 B2    5/2016 Gianniotis et al.
2003/0065562 A1* 4/2003 Matsui ............... G06Q 30/0255
                                           705/14.49
(Continued)

FOREIGN PATENT DOCUMENTS

WO    2019086553 A1    5/2019

OTHER PUBLICATIONS

"Data Pseudonymizer", cloudmatrix-cto / ds-pseudonymize, Latest commit 7694038 on Jul. 20, 4 pages, <https://github.ibm.com/cloudmatrix-cto/ds-pseudonymize>.
(Continued)

*Primary Examiner* — Kiet M Doan
(74) *Attorney, Agent, or Firm* — Christopher M. Pignato

(57) ABSTRACT

Computer systems, methods and program products for automating pseudonymization of personal identifying information (PII) using machine learning, metadata, and crowdsourcing patterns to identify and replace PII. Machine learning models are trained for classifying known column names or key names for processing, using metadata. Column or key names are classified to be unprocessed, anonymized or pseudonymized by a pseudonymizer without revealing PII or scrubbing data into a useless format. A library of crowdsourced patterns are utilized for matching PII to data values within column or key names and PII is mapped to replacement methods. Feedback from user annotations retrains the algorithms to improve classification accuracy and Deep Learning algorithms automate the identification of PII using regular expression generation to concisely articulate how pseudonymizers search for PII patterns within a data set. PII replacement is mapped consistently across entire data packages and the crowdsourced pattern library is updated with generated regular expressions.

17 Claims, 11 Drawing Sheets

(51) Int. Cl.
    *G06F 21/62*     (2013.01)
    *G06K 9/62*      (2022.01)
    *G06F 40/205*    (2020.01)
(58) Field of Classification Search
    USPC .................................. 726/27, 28, 1; 713/182
    See application file for complete search history.

(56) References Cited

U.S. PATENT DOCUMENTS

| | | | |
|---|---|---|---|
| 2010/0070500 A1* | 3/2010 | Cui .................. | G06F 16/84 |
| | | | 707/736 |
| 2012/0036139 A1* | 2/2012 | Okamoto ........... | H04N 21/4722 |
| | | | 707/E17.137 |
| 2016/0371275 A1* | 12/2016 | Bernstein .............. | G06F 40/169 |
| 2018/0012039 A1 | 1/2018 | Takahashi et al. | |
| 2018/0114037 A1 | 4/2018 | Scaiano et al. | |
| 2018/0336369 A1 | 11/2018 | Margalit et al. | |
| 2020/0081899 A1* | 3/2020 | Shapur .................. | G06F 16/211 |

OTHER PUBLICATIONS

Mell et al., "The NIST Definition of Cloud Computing", Recommendations of the National Institute of Standards and Technology, NIST Special Publication 800-145, Sep. 2011, 7 pages.

\* cited by examiner

COGNITIVE DATA PSEUDONYMIZATION

TECHNICAL FIELD

The present disclosure relates generally to the field of data science and more specifically to data pseudonymization.

BACKGROUND

Data anonymization is the use of one or more techniques designed to make it impossible or at the very least difficult to identify a particular person or personal identifying information related to a person from a data value. Data anonymization seeks to protect private or sensitive data by deleting or encrypting personally identifiable information from a database. Data anonymization methods include encryption, hashing, generalization, pseudonymization and perturbation. Data anonymization can be done for the purpose of protecting an individual's or company's private activities while maintaining the integrity of the data gathered and shared. Data anonymization techniques seek to conceal the identity and identifiers that can be applied to a person. Personal identifying information may include family names, first names, maiden names, aliases, addresses, phone numbers, ID numbers, social security numbers, credit card info, etc. Data anonymization is also known as "data obfuscation," "data masking," or "data de-identification.".

SUMMARY

Embodiments of the present disclosure relate to a computer-implemented method, an associated computer system and computer program product for pseudonymizing data. The computer implemented method comprising: analyzing, by the processor, metadata of a data package comprising personal identifying information; extracting, by the processor, column names or key names from the metadata; mapping, by the processor, the column names or the key names, to a classification indicating whether data values associated with the column names or the key names are configured to be unprocessed, anonymized or pseudonymized during processing of the data values; and outputting, by the processor, a configuration file instructing a pseudonymizer to pseudonymize the data values associated with the column names or the key names classified to be pseudonymized.

DETAILED DESCRIPTION

Figure 1:
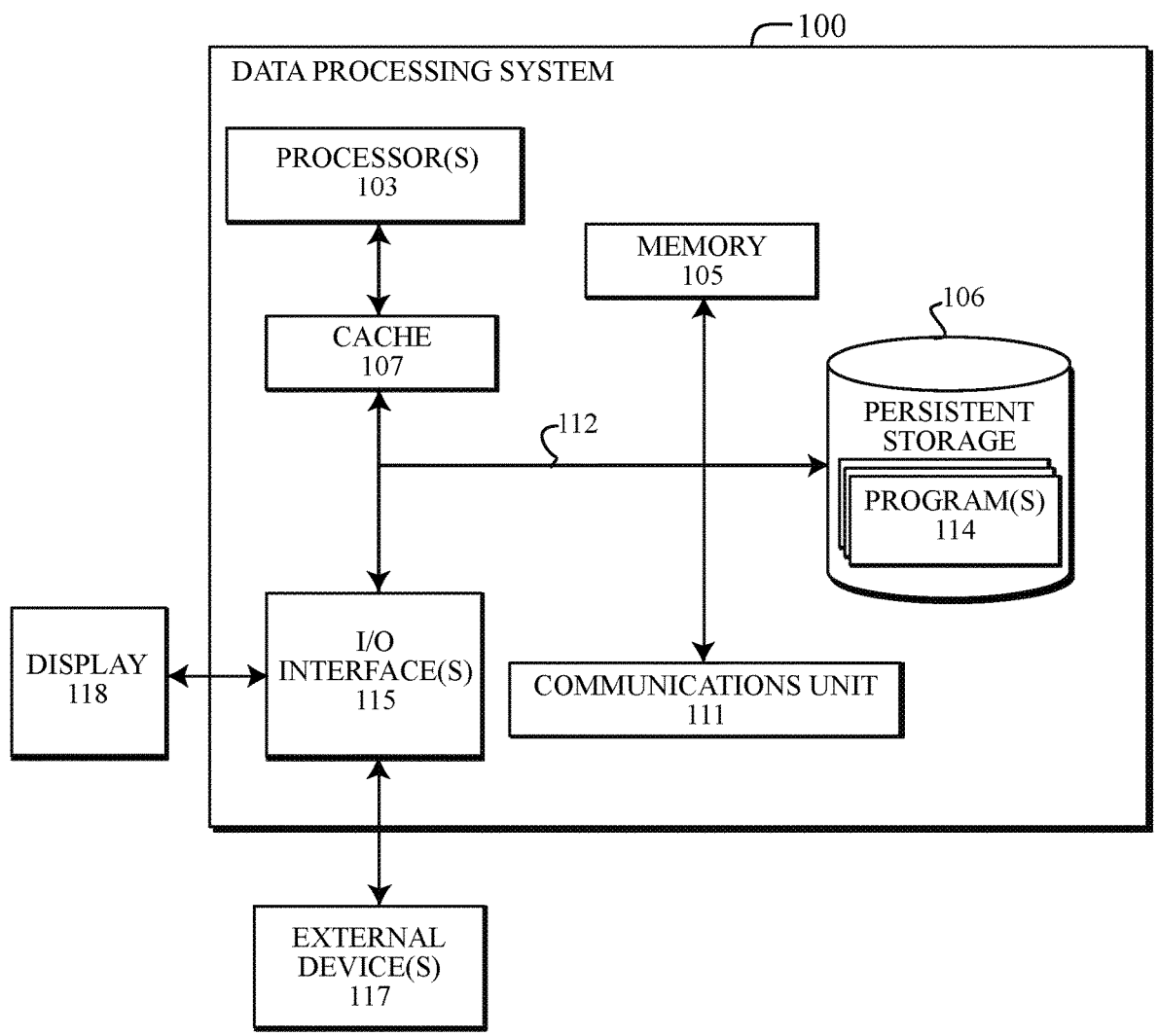
FIG. 1 depicts an embodiment of a block diagram of internal and external components of a data processing system in which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

Overview

Data is the fuel that drives modern day machine learning and deep learning applications. However, with the advent of new data privacy guidelines, such as Europe's initiatives under the General Data Protection Regulation (GDPR), data scientists must strike a balance between obtaining quality data that complies with privacy regulations and protecting against the disclosure of private or personally identifying information (PII). To maintain compliance with privacy protections such as the GDPR, data scientists are tasked with scrubbing data of any PII that may be present, in order to prevent revealing the PII when the data is consumed by data scientists. Embodiments of the present disclosure recognize that existing data scrubbing techniques are performed manually, are incomplete and in many instances render the data useless to the data scientist once the scrubbing has been performed. Scrubbing PII from data manually and keeping track of all the different types of PII in order to maintain compliance with privacy protections is nearly impossible, while completely scrubbing data results in loss fidelity of the data, preventing data scientists from gaining useful insights. Embodiments of the present disclosure leverages the use of machine learning, crowd sourced libraries of data patterns, deep learning and pseudonymization to automate data scrubbing, improving PII recognition, and improving compliance with privacy protection laws such as the GDPR without losing valuable insights that can be gained from the data being scrubbed. Embodiments of the disclosure scrubs all types of data, including structured, semi-structured and unstructured data and maps raw values to scrubbed values universally across all datasets of a data package, preserving the value of the data to maintain useful insights.

Embodiments of the present disclosure classify the data being uploaded for scrubbing by initially using the metadata to assign classifications based on fields describing the data provided. For example, classifying data based on the column names or the key names described by the metadata. Classifying uploaded data based on the column names, key names or other fields described by the metadata, helps provide an additional layer of protection to the data by not revealing data values of the PII contained within the uploaded data, since the data values are not examined during the metadata classification stage. Embodiments of the present disclosure may use machine learning algorithms such as a classification model to assign a classification to the data based on the fields described by the metadata. For example, column names or key names of the metadata can be assigned classifications that identify the data within the column name to be left unprocessed, anonymized and/or pseudonymized. The "unprocessed" classification may be assigned to columns or key name, based on the training of the machine learning model, where no PII is expected. All values in the column or key that will not be processed for scrubbing can be ignored and left unscrubbed. The "anonymized" classification may indicate that the machine learning model expects PII to be present within the column or key, but the data is not expected to be useful to data scientists, and therefore can be scrubbed without mapping the raw data to the scrubbed data. Columns or keys classified as "pseudonymized" are anticipated to store PII within the column or key name that is useful and should therefore be scrubbed and raw data values are to be mapped to the scrubbed data values. Generated classifications can be outputted to a configuration file describing the column or key name, and the classification assigned thereto.

Embodiments of the present disclosure can further use machine learned patterns of the data values stored by the datasets of data packages being scrubbed, using natural language understanding to identify patterns within the data that match data patterns from a crowdsourced library of data patterns. Embodiments of the present disclosure can filter the columns or keys of the datasets to match the columns or keys of the configuration file and parse the data values within the columns or key names. Using the library of patterns as a reference, machine learning and textual analytics can determine the type of PII contained within the columns or key names and the data values can be matched to a data pattern described by the library of patterns. Using a classification model, machine learning can assign a replacement method to the type of PII data values identified within a column or key. Embodiments of the present disclosure allow users to review the identifications of PII and the replacement methods assigned thereto. Users may annotate and provide feedback to the system, which may help to refine the machine learning model and improve the library of data patterns, based on the user annotations and feedback. The configuration file providing instructions to the pseudonymizer may be updated accordingly to not only include the classification of the columns or key names, but to further include the type of PII which may be used as a blueprint for identifying the PII data values within the datasets stored by the column or key, and the replacement method for scrubbing the PII found within the column or key.

In some embodiments, the library of data patterns may include one or more regular expressions associated with columns or key names for identifying types of PII that may be stored as data values or a portion of the data values within specified columns or keys. A regular expression ("regex") may be a search pattern used for matching a sequence of symbols and/or one or more characters within a string. Data values within the datasets or data packages being analyzed can be matched to PII using pattern recognition and regular expressions to concisely search through the data values for PII. Embodiments of the present disclosure may use one or more regular expressions identified within the pattern library as the searching method for identifying PII-containing data values within datasets or data packages to the columns or key names described by the configuration file. An updated configuration file can be outputted describing the type of PII identified within a column or key name, as a function of one or more regular expressions.

Embodiments of the present disclosure may further improve upon the identification of PII stored within the data values of the datasets and/or data packages by using one or more user annotations and/or user feedback to automatically generate one or more regular expressions concisely identifying PII and/or updating the library of data patterns to reflect the automatically generated regular expressions. Embodiments of the present disclosure may load annotations or feedback provided by the user into one or more deep learning models, and each deep learning model may generate a regular expression capturing or describing how to identify the PII annotated by the user. The one or more deep learning models may arrive at different regular expressions as a result of the annotation analysis. The annotation may be amended or articulated in a concise manner as a single regular expression encompassing scope of all the regular expressions generated by the deep learning models. Embodiments of the present disclosure may present the automatically generated regular expression to the user for further annotation and feedback. Additional annotations and feedback may be used to provide additional training to the deep learning models and refine the automatically generated regular expression further, to more precisely identify PII within a column or key name using the generated regular expression. Accordingly, the automatically generated regular expression may be inserted into the configuration file and the pseudonymizer may perform pseudonymization of the datasets of the data package, using the configuration file as a template for identifying and/or replacing PII within the columns or key names identified in the configuration file for pseudonymization.

Moreover, over time, machine learning algorithms identifying patterns based on the pattern library may indicate that the regular expressions being automatically generated using the deep learning models are frequently being generated and/or adopted by users to describe PII the same types of PII being analyzed. Accordingly, as the generated regular expressions are used more and more, the library of data patterns may integrate the automatically generated regular expressions into library of data patterns, allowing for updated PII recognition during future use of pseudonymizer.

Data Processing System

The present invention may be a system, a method, and/or a computer program product at any possible technical detail level of integration. The computer program product may include a computer-readable storage medium (or media) having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

FIG. 1 illustrates a block diagram of a data processing system 100, which may be a simplified example of a computing system capable of performing the computing operations described herein. Data processing system 100 may be representative of the one or more computing systems or devices depicted in the computing environment 200, 260, 300 as shown in FIGS. 2a-5c, and in accordance with the embodiments of the present disclosure. It should be appreciated that FIG. 1 provides only an illustration of one implementation of a data processing system 100 and does not imply any limitations with regard to the environments in which different embodiments may be implemented. In general, the components illustrated in FIG. 1 may be representative of any electronic device capable of executing machine-readable program instructions.

While FIG. 1 shows one example of a data processing system 100, a data processing system 100 may take many different forms, both real and virtualized. For example, data processing system 100 can take the form of personal desktop computer systems, laptops, notebooks, tablets, servers, client systems, network devices, network terminals, thin clients, thick clients, kiosks, mobile communication devices (e.g., smartphones), augmented reality devices, multiprocessor systems, microprocessor-based systems, minicomputer systems, mainframe computer systems, smart devices, or Internet-of-Things (IoT) devices. The data processing systems 100 can operate in a networked computing environment 200, 260, and a distributed cloud computing environment 300, which can include any of the systems or devices described herein and/or additional computing devices or systems known or used by a person of ordinary skill in the art.

Data processing system 100 may include communications fabric 112, which can provide for electronic communications between one or more processor(s) 103, memory 105, persistent storage 106, cache 107, communications unit 111, and one or more input/output (I/O) interface(s) 115. Communications fabric 112 can be implemented with any architecture designed for passing data and/or controlling information between processor(s) 103 (such as microprocessors, communications, and network processors, etc.), memory 105, external devices 117, and any other hardware components within a data processing system 100. For example, communications fabric 112 can be implemented as one or more buses.

Memory 105 and persistent storage 106 may be computer-readable storage media. Embodiments of memory 105 may include random access memory (RAM) and cache 107 memory. In general, memory 105 can include any suitable volatile or non-volatile computer-readable storage media and may comprise firmware or other software programmed into the memory 105. Software applications, program(s) 114, applications and services, described herein, may be stored in memory 105 and/or persistent storage 106 for execution and/or access by one or more of the respective processor(s) 103 of the computer system 100.

Persistent storage 106 may include a plurality of magnetic hard disk drives. Alternatively, or in addition to magnetic hard disk drives, persistent storage 106 can include one or more solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 106 can also be removable. For example, a removable hard drive can be used for persistent storage 106. Other examples include optical and magnetic disks, thumb drives, and smart cards that are inserted into a drive for transfer onto another computer-readable storage medium that is also part of persistent storage 106.

Communications unit 111 provides for the facilitation of electronic communications between data processing systems 100. For example, between one or more computer systems or devices via a communication network. In the exemplary embodiment, communications unit 111 may include network adapters or interfaces such as a TCP/IP adapter cards, wireless Wi-Fi interface cards, 3G, 4G, or 5G wireless interface cards or other wired or wireless communication links. Communication networks can comprise, for example, copper wires, optical fibers, wireless transmission, routers, firewalls, switches, gateway computers, edge servers and/or other network hardware which may be part of, or connect to, nodes of the communication networks devices, systems, hosts, terminals or other network computer systems. Software and data used to practice embodiments of the present invention can be downloaded to the computer systems operating in a network environment through communications unit 111 (e.g., via the Internet, a local area network or other wide area networks). From communications unit 111, the software and the data of program(s) 114 can be loaded into persistent storage 106.

One or more I/O interfaces 115 may allow for input and output of data with other devices that may be connected to data processing system 100. For example, I/O interface 115 can provide a connection to one or more external devices 117 such as one or more smart devices, IoT devices, recording devices such as an audio system, camera systems, one or more sensor device(s), input devices such as a keyboard, computer mouse, touch screen, virtual keyboard, touchpad, pointing device, or other human interface devices. External devices 117 can also include portable computer-readable storage media such as, for example, thumb drives, portable optical or magnetic disks, and memory cards. I/O interface 115 may connect to human-readable display 118. Human-readable display 118 provides a mechanism to display data to a user and can be, for example, a computer monitor or screen. Human-readable display 118 can also be an incorporated display and may function as a touch screen, such as a built-in display of a tablet computer.

System for Pseudonymizing Data

Referring to the drawings, FIGS. 2a-5c depict an approach that can be executed using one or more data processing systems 100 operating within a computing environment 200, 260, 300 and variations thereof, to implement systems, methods and computer program products for pseudonymizing data. Embodiments of computing environments 200, 260, 300 may include one or more data processing systems 100 interconnected via a device network 250.

The data processing systems 100 connected to the device network 250 may be specialized systems or devices that may include, but are not limited to, the interconnection of one or more host system 201 and/or client system 235a-235n (referred to generally as client system 235). The data processing systems 100 exemplified in FIGS. 2a-5c may not only comprise the elements of the systems and devices depicted in the drawings of FIGS. 2a-5c, but the specialized data processing systems depicted may further incorporate one or more elements of a data processing system 100 shown in FIG. 1 and described above. Although not shown in the figures, one or more elements of the data processing system 100 may be integrated into the embodiments of host system 201 and/or client system 235, including (but not limited to) the integration of one or more processor(s) 103, program(s) 114, memory 105, persistent storage 106, cache 107, communications unit 111, input/output (I/O) interface(s) 115, external device(s) 117 and human-readable display 118.

Embodiments of the host system 201 and/or client system 235 may be placed into communication with one another via computer network 250. Embodiments of network 250 may be constructed using wired, wireless or fiber-optic connections. Embodiments of the host system 201 and/or client system 235 may connect and communicate over the network 250 via a communications unit 111, such as a network interface controller, network interface card or other network communication device capable of facilitating a connection with network 250. In some embodiments of computing environments 200, 260, 300, one or more host system 201, client system 235 or other data processing systems 100 may represent data processing systems 100 utilizing clustered computers and components acting as a single pool of seamless resources when accessed through network 250. For example, such embodiments can be used in a data center, cloud computing, storage area network (SAN), and network-attached storage (NAS) applications.

Embodiments of the communications unit 111 may implement specialized electronic circuitry, allowing for communication using a specific physical layer and a data link layer standard. For example, Ethernet, Fiber channel, Wi-Fi or Token Ring to transmit data between the host system 201 and/or client systems 235 connected to network 250. Communications unit 111 may further allow for a full network protocol stack, enabling communication over network 250 to groups of host systems 201 and/or client systems 235 and other data processing systems 100 linked together through communication channels of network 250. Network 250 may facilitate communication and resource sharing among host systems 201, client systems 235 and other data processing systems 100 (for example, network-accessible storage media) connected to the network 250. Examples of network 250 may include a local area network (LAN), home area network (HAN), wide area network (WAN), backbone networks (BBN), peer to peer networks (P2P), campus networks, enterprise networks, the Internet, cloud computing networks and any other network known by a person skilled in the art.

Cloud computing networks are a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment 300 is service-oriented with a focus on statelessness, low coupling, modularity, and semantic interoperability. At the heart of cloud computing is an infrastructure that includes a network 250 of interconnected nodes 310.

Figure 3:
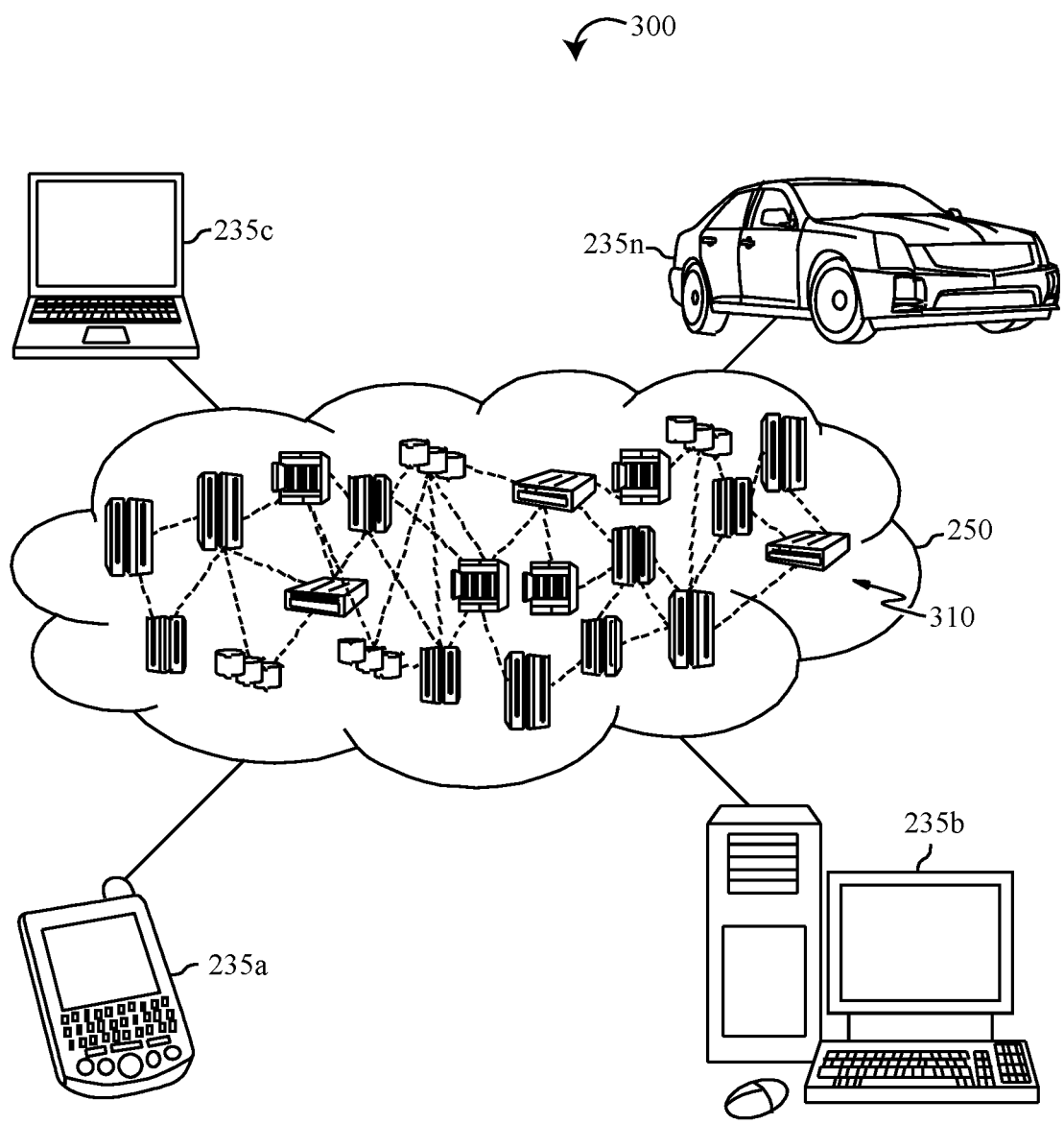
FIG. 3 depicts an embodiment of a cloud computing environment within which embodiments described herein may be implemented in accordance with the present disclosure.

Referring to the drawings, FIG. 3 is an illustrative example of a cloud computing environment 300. As shown, cloud computing environment 300 includes one or more cloud computing nodes 310 with which client systems 235 operates as a client controlled by the cloud consumers. Client system 235 may communicate with the cloud computing environment 300, for example via client systems 235a, 235b, 235c, 235n as illustrated in FIG. 3. Nodes 310 of the cloud computing environment 300 may communicate with one another and may be grouped (not shown) physically or virtually, in one or more networks, such as Private, Community, Public, or Hybrid clouds as described hereinabove, or a combination thereof. This may allow the cloud computing environment 300 to offer infrastructure, platforms and/or software as services for which a cloud consumer does not need to maintain resources on a client system 235. It is understood that the types of client systems 235 connected to the cloud computing environment 300, are intended to be illustrative only and that computing nodes 310 of the cloud computing environment 300 can communicate with any type of computerized device over any type of network and/or network addressable connection (e.g., using a web browser).

Figure 4:
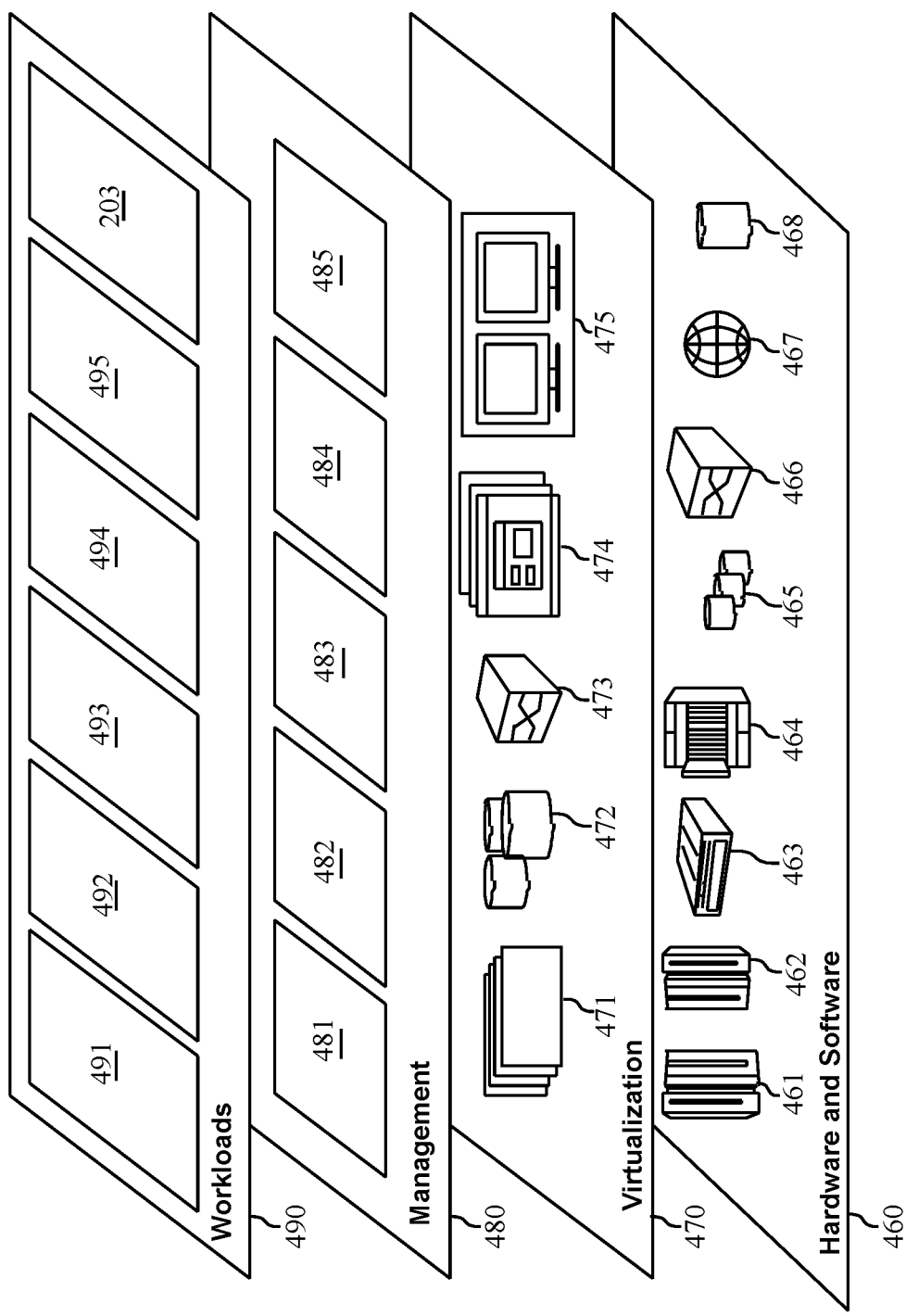
FIG. 4 depicts an embodiment of abstraction model layers of a cloud computing environment in accordance with the present disclosure.

Referring now to FIG. 4, a set of functional abstraction layers provided by cloud computing environment 300 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include mainframes 461; RISC (Reduced Instruction Set Computer) architecture-based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

In one example, management layer 480 may provide the functions described below. Resource provisioning 481 provides dynamic procurement of computing resources and other resources that are utilized to perform tasks within the cloud computing environment 300. Metering and pricing 482 provide cost tracking as resources are utilized within the cloud computing environment 300, and billing or invoicing for consumption of these resources. In one example, these resources can include application software licenses. Security provides identity verification for cloud consumers and tasks, as well as protection for data and other resources. User portal 483 provides access to the cloud computing environment 300 for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include mapping and navigation 491, software development and lifecycle management 492, data analytics processing 493, virtual classroom education delivery 494, transaction processing 495, and pseudonymizer 203.

Referring back to FIG. 2a, FIG. 2a depicts an embodiment of a computing environment 200 capable of pseudonymizing data and more specifically, pseudonymizing private and/or personal identifying information, to help protect against revealing the PII stored by the data, while still being able to gain insights from the data. Embodiments of computing environment 200 feature a network 250 connected to a plurality of specialized data processing systems 100, including host system 201 and one or more client systems 235. The specialized data processing systems 100 of computing environment 200 may comprise specialized configurations of hardware, software or a combination thereof, as shown and described herein, including specialized modules for implementing one or more particular tasks, functions, or processes for performing pseudonymization of data being scrubbed by the host system 201. The term "module" may refer to a hardware module, software module, or a module may be a combination of hardware and software resources. Embodiments of hardware-based modules may include self-contained components such as chipsets, specialized circuitry, one or more memory 105 devices and/or persistent storage 106. A software-based module may be part of a program 114, program code or linked to program code containing specifically programmed instructions loaded into a memory 105 device or persistent storage 106 device of one or more specialized data processing systems 100 operating as part of the computing environment 200. For example, a pseudonymizer 203 module, program, service and/or application depicted in FIG. 2a, loaded into the memory 105 or persistent storage 106 of the host system 201.

Embodiments of pseudonymizer 203 may perform the functions, tasks or processes associated with fulfilling requests submitted by users via a pseudonymizer interface 237a-237c (referred to generally as pseudonymizer interface 237) to scrub one or more datasets and/or data packages provided by users to the host system 201. In some embodiments, datasets and/or data packages may be uploaded by the client system 235 to a data repository 215, data warehouse or other data storage structure which may be hosted by host system 201 or accessible to the host system 201 over network 250. The functions, tasks or processes fulfilled by the pseudonymizer 203 may include the classification of fields within data packages or datasets using metadata associated therewith, implementing machine learning algorithms to perform data pattern recognition in order to identify PII data values stored within the fields of the metadata, assigning replacement methods for the identified data using the data patterns of the pattern library 209 as a reference, revising PII identification patterns through automated generation of regular expressions and pseudonymizing data labeled as PII by scrubbing the data in accordance with the assigned replacement method. In some embodiments, the pseudonymizer 203 may comprise one or more modules or sub-components assigned to perform one or more tasks or functions of the pseudonymizer 203. For example, in the exemplary embodiment of FIG. 2a, the pseudonymizer 203 comprises a language processing module 205, machine learning module 207, pattern library 209 and a reporting engine 211.

Embodiments of the language processing module 205 may perform functions, tasks or processes associated with analyzing metadata and/or data values of one or more datasets that make up the data packages being scrubbed. Language processing module 205 may understand and/or recognize one or more fields within the metadata, including but not limited to recognizing column names or key names describing the fields present within the metadata during metadata classification. Moreover, during analysis of the data values contained within the column or key names, language processing module 205 may parse data values for PII using text analytics to match data values to data patterns described by a pattern library 209 as being historically known to comprise (at least in part) PII.

Figure 2A:
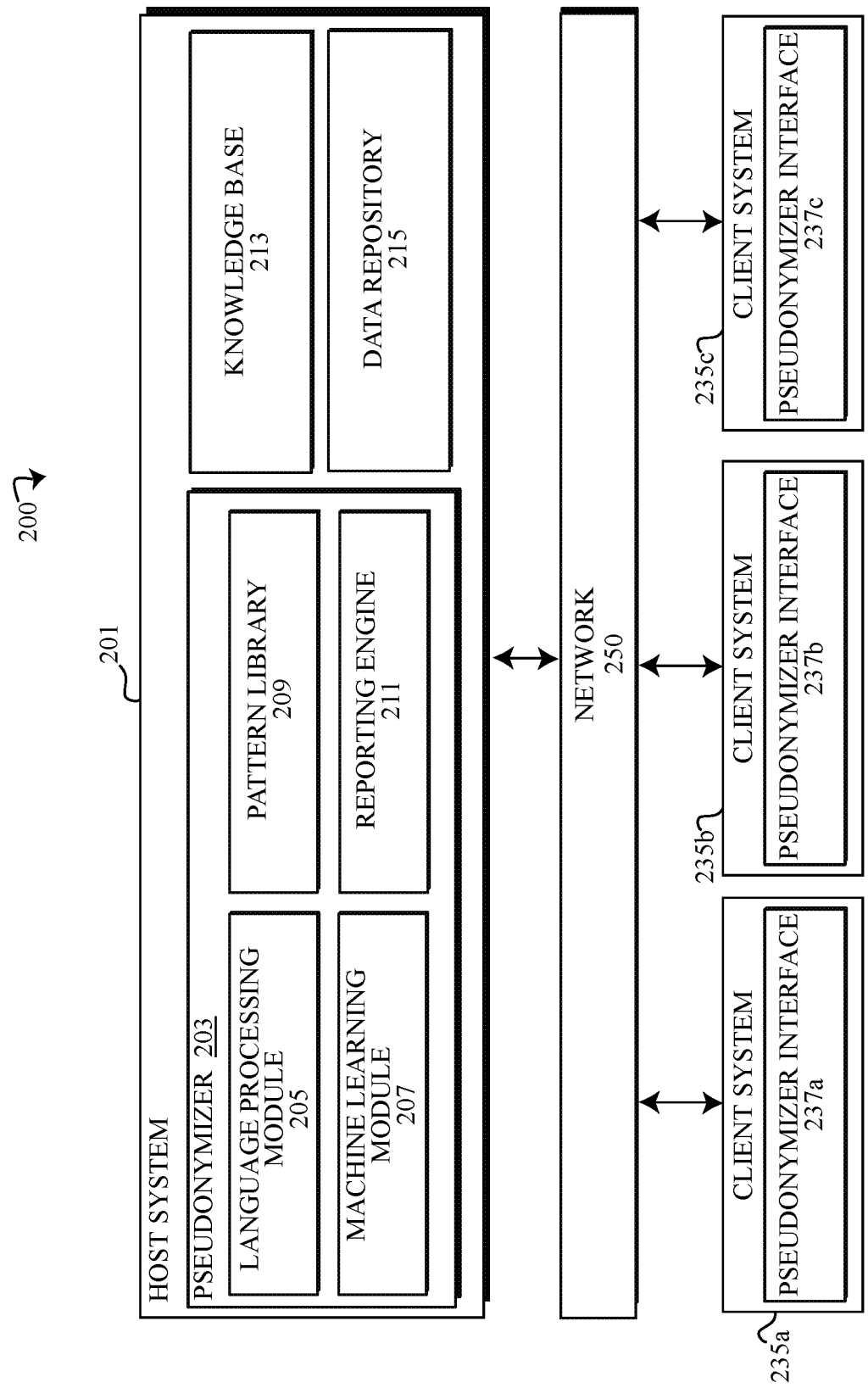
FIG. 2a depicts a block diagram of an embodiment of a computing environment for pseudonymizing data in accordance with the present disclosure.
Figure 2B:
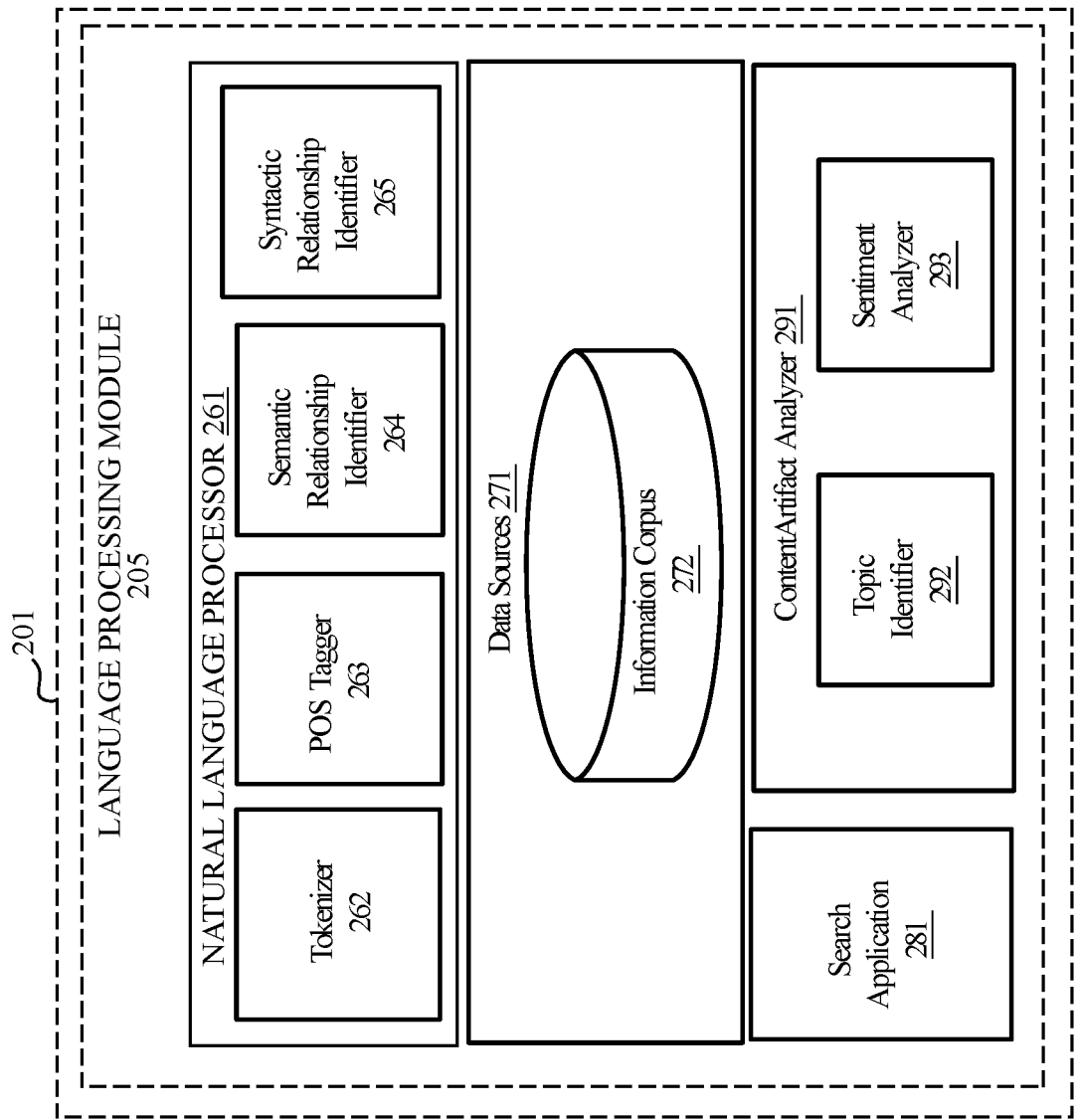
FIG. 2b depicts a block diagram describing an embodiment of a language processing module, in accordance with the present disclosure.

FIG. 2b depicts a block diagram describing an embodiment of language processing module 205 comprising one or more components and features. In some embodiments, client system 235 may transmit datasets of one or more data packages to the pseudonymizer 203. Transmitted datasets uploaded to data repository 215 may be accompanied with metadata containing textual data describing the types of data values that are present within the dataset. Examples of the datasets may be in the form of structured (i.e. CSV), semi-structured (i.e. json) and/or unstructured (i.e. text documents) files. The language processing module 205 may conduct an analysis of the metadata for column names and key names describing the types of data stored by the data packages uploaded or provided to the host system 201, as well as match data values to the known patterns of the pattern library 209, which may be crowdsourced from users utilizing the pseudonymizer 203 to scrub data packages or users with historical experiences identifying and scrubbing data. Embodiments of the language processing module 205 may be part of the host system 201, a separate standalone device, or part of a broader data processing system 100.

Embodiments of language processing module 205 may analyze the textual information stored by the metadata and data values stored within the datasets scheduled to be scrubbed. While analyzing metadata for classification purposes, embodiments of the language processing module 205 may break down each item in the metadata to identify meaningful words, such as column names and key names that describe categories of data that might be stored by the data sets, without actually analyzing the data values directly during metadata classification operations. During the analysis of the dataset's data values, language processing module 205 may identify PII stored by the datasets, by directly parsing the data values with reference to the pattern library, in order to find matches between the data values and known data patterns.

In some embodiments, the language processing module 205 may include a natural language processor 261, data sources 271, a search application 281, and a content artifact analyzer 291. The natural language processor 261 may comprise a computer module that analyzes the received metadata and datasets of the data packages being scrubbed. The natural language processor 261 may perform various methods and techniques for analyzing the text of the metadata and data values (e.g., syntactic analysis, semantic analysis, etc.). The natural language processor 261 may be configured to recognize and analyze any number of natural languages. In some embodiments, the natural language processor 261 may parse column names and key names and data values stored therein, while removing delimiters to create or understand a word or phrase that may be present. Furthermore, the natural language processor 261 may include various modules to perform analyses of the metadata and data values of the data sets. These modules may include, but are not limited to, a tokenizer 262, a part-of-speech (POS) tagger 263, a semantic relationship identifier 264, and a syntactic relationship identifier 265.

Embodiments of tokenizer 262 may be a computer module that performs lexical analysis. The tokenizer 262 may convert a sequence of characters into a sequence of tokens. A token may be a string of characters included in the metadata or a data value within dataset and categorized as a meaningful symbol. Further, in some embodiments, the tokenizer 262 may identify word boundaries of the inputted text of the data values or metadata and break text passages into component text elements, such as words, multiword tokens, numbers, and punctuation marks. In some embodiments, the tokenizer 262 may receive a string of characters, identify the lexemes in the string, and categorize them into tokens.

Consistent with various embodiments, the POS tagger 263 may be a computer module that marks up a word in passages to correspond to a particular part of speech. The POS tagger 263 may read a passage or other text in natural language and assign a part of speech to each word or other token. The POS tagger 263 may determine the part of speech to which a word (or other text element) corresponds, based on the definition of the word and the context of the word. The context of a word may be based on its relationship with adjacent and related words in a phrase, sentence, or paragraph. In some embodiments, the context of a word may be dependent on one or more previously analyzed. In embodiments, the output of the natural language processor 261 may populate a text index, a triplestore, or a relational database to enhance the contextual interpretation of a word or term. Examples of parts of speech that may be assigned to words include, but are not limited to, nouns, verbs, adjectives, adverbs, and the like. Examples of other part of speech categories that POS tagger 263 may assign include, but are not limited to, comparative or superlative adverbs, wh-adverbs, conjunctions, determiners, negative particles, possessive markers, prepositions, wh-pronouns, and the like. In some embodiments, the POS tagger 263 may tag or otherwise annotate tokens of a passage with part of speech categories. In some embodiments, the POS tagger 263 may tag tokens or words of a passage to be parsed by the natural language processor 261.

In some embodiments, the semantic relationship identifier 264 may be a computer module that may be configured to identify semantic relationships of recognized text elements (e.g., words, phrases) in the metadata and/or datasets transmitted by the client system 235 to the pseudonymizer 203. In some embodiments, the semantic relationship identifier 264 may determine functional dependencies between entities and other semantic relationships. Consistent with various embodiments, the syntactic relationship identifier 265 may be a computer module that may be configured to identify syntactic relationships in a passage composed of tokens. The syntactic relationship identifier 265 may determine the grammatical structure of sentences such as, for example, which groups of words are associated as phrases and which word is the subject or object of a verb. The syntactic relationship identifier 265 may conform to formal grammar.

In some embodiments, the natural language processor 261 may be a computer module that may parse the metadata and data values to generate corresponding data structures for one or more portions of the parsed data or metadata. For example, in response to receiving an unstructured textual report, the natural language processor 261 of the language processing module 205 may output parsed text elements from the report as data structures. In some embodiments, a parsed text element may be represented in the form of a parse tree or other graph structure. To generate the parsed text element, the natural language processor 261 may trigger computer modules 262-265.

In some embodiments, the output of natural language processor 261 may be used by search application 281 to perform a search of a set of (e.g., one or more) corpora to retrieve information regarding content artifacts and/or other media within the data and metadata analyzed. As used herein, a corpus may refer to one or more data sources 271. In some embodiments, the data sources 271 may include data warehouses, information corpora, data models, and document repositories, such as data repository 215. In some embodiments, the data sources 271 may include an information corpus 272. The information corpus 272 may enable data storage and retrieval. In some embodiments, the information corpus 272 may be a storage mechanism that houses a standardized, consistent, clean, and integrated lists of data values, column names, key names or other data fields that might be present within the data and metadata being analyzed. The information corpus 272 may also store a list of associated outcomes. The data may be sourced from various operational systems and the information corpus 272 may be structured in a way to specifically address reporting and analytic requirements. In some embodiments, the information corpus 272 may be a data repository 215, a relational database, triplestore, or text index.

In some embodiments, the content artifact analyzer 291 may be a module that identifies data values or metadata fields associated with one or more topics. In some embodiments, the content artifact analyzer 291 may include a topic identifier 292 and a sentiment analyzer 293. When metadata is received by the language processing module 205, the content artifact analyzer 291 may be configured to analyze data and metadata using natural language processing to identify one or more content topics, including one or more column names or key names associated with the data or metadata. The content artifact analyzer 291 may first parse the data or metadata using the natural language processor 261 and related subcomponents 262-265. After parsing the metadata and/or data, the topic identifier 292 may identify one or more fields within the metadata describing topics contained within the content being described by the metadata or match patterns of the data values within the datasets to known data patterns for identifying PII. This may be done, for example, by searching a known data sources 271 (e.g., pattern library 209) using the search application 281 for relevant data patterns historically known to the language processing module 205 to be associated with PII.

Embodiments of the pseudonymizer 203 may comprise a machine learning module 207. The machine learning module 207 may perform functions, tasks or processes associated with classifying fields of the metadata, such as columns or key names to one or more known classifications for scrubbing (or not scrubbing) the associated data values. In the exemplary embodiments, the machine learning module 207 may apply a classification learning model to column names, key names or other data fields extracted from the metadata by the language processing module 205 and classify the extracted column or key names of the metadata based on the expected type of PII and value of the PII expected within the column name or key name. For instance, columns or key names that will remain unprocessed because a lack of expected PII to be stored within the column or key name, may be classified as "none", while columns or key names expected to contain PII data values that are not useful for generating insights can be classified for scrubbing as anonymize (i.e. "anon"), which will scrub the data but not map raw data values to the anonymized data values. Likewise, columns or key names classified for scrubbing and mapping of the raw data values can be classified as pseudonymize ("pseudo") by machine learning module 207.

Embodiments of the machine learning module 207 may also perform functions, tasks or processes, associated with selecting and assigning a PII replacement methods to PII identified by the language processing module 205 using the PII patterns made available as part of the pattern library 209 to use a reference for making the identifications. The machine learning models of the machine learning module 207 can predict with a particular level of confidence, which replacement methods should be applied to the data values of the datasets when scrubbing the data values, based on the patterns of PII described in pattern library 209 and the recommended replacement methods for the identified PII patterns that match the types of PII data within the datasets of the data package.

Figure 5A:
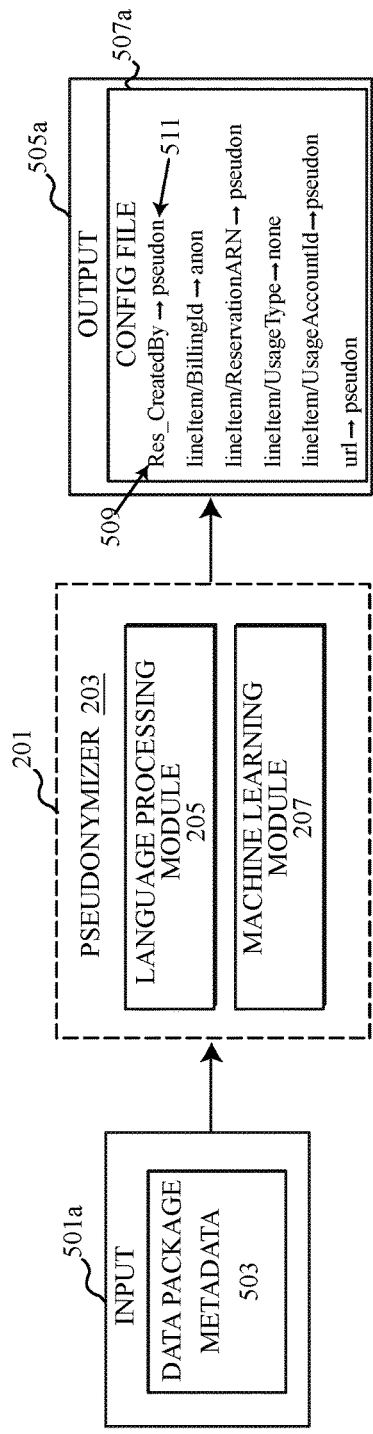
FIG. 5a depicts an embodiment of a workflow diagram illustrating classification of one or more fields from data package metadata.
Figure 5B:
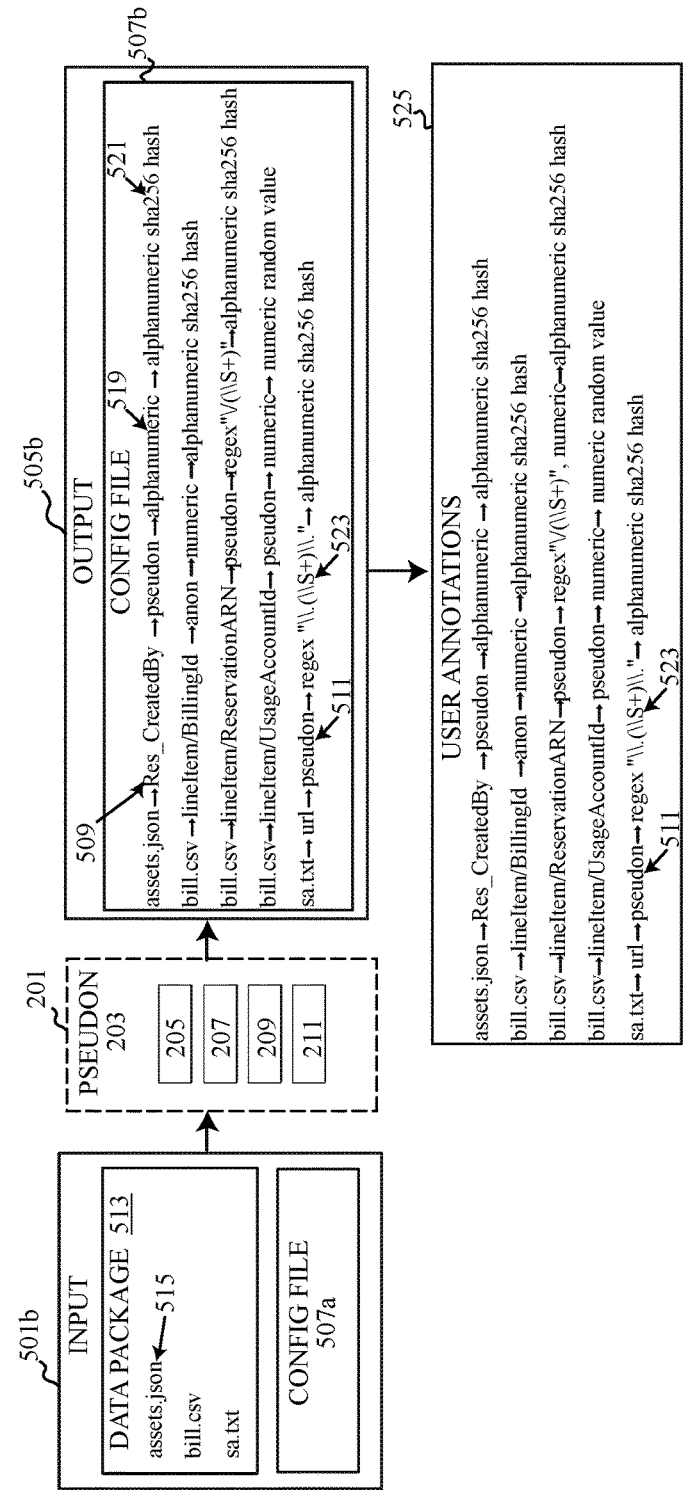
FIG. 5b depicts an embodiment of a workflow diagram illustrating identification of one or more types of personal identifying information, assignment of a replacement method and implementation of user annotations of a configuration file.

For example, in the data package 513 depicted in FIG. 5b, the dataset 515 labeled as "bill.csv" comprises a data point within the dataset 515 having a data value of "arn:735363466628:ris/ed0wzw-rp-8bilo-ip4pyxsd-6chsnsv" found within column name "lineItem/ReservationARN." Using the pattern library 209 as a reference, the data value may comprise enough similar qualities to the form and format of the data patterns in the pattern library 209 that enable the language processing module 205 to identify the data value as a server id. Moreover, embodiments of the language processing module 205 may further identify based on the historical patterns of server id data values described by the pattern library 209, the string "ed0wzw-rp-8bilo-ip4pyxsd-6chsnsv" is the portion considered to be PII that should be pseudonymized. Furthermore, based on the pattern library 209, the language processing module 205 may indicate that the PII comprising the string "ed0wzw-rp-8bilo-ip4pyxsd-6chsnsv" within the data value and can be pinpointed within the datasets of the data package using the regular expression regex "\/(\\S+)". Using the pattern library 209, the machine learning module 207 can apply a classification model to assign a replacement method based on the replacement methods for following a similar pattern for server ids within the pattern library 209. For example, if server ids bearing a similar data pattern are being assigned an alphanumeric sha256 hash as the replacement method, the machine learning module 207 may follow the pattern and map the same replacement method to the data value identified within bill.csv. Moreover, where the same server id is found within other datasets 515 of data package 513, the machine learning module 207 may map the same alphanumeric sha256 hash to the server id across the entire data package 513.

Embodiments of the machine learning module 207 may determine classifications of the metadata fields such as columns or key names and/or classifications of replacement methods to apply to the data values identified as PII by the language processing module 205 using cognitive computing and machine learning techniques to identify patterns in the data values compared with the pattern library 209 with minimal intervention by a human user and/or administrator. Embodiments of the machine learning module 207 may also incorporate techniques of data mining, deep learning and data clustering to supplement and/or replace machine learning techniques that may be applied to classifications data and metadata. Embodiments of the machine learning techniques that may be implemented by the machine learning module 207 to map classification to the data and metadata of the data packages, may include supervised learning, unsupervised learning and/or semi-supervised learning techniques. Supervised learning is a type of machine learning that may use one or more computer algorithms to train the machine learning module 207 using labeled examples during a training phase. The term "labeled example" may refer to the fact that during the training phase, there are desired inputs that will produce a known desired output by the machine learning module 207. The algorithm of the machine learning module 207 may be trained by receiving a set of inputs along with the corresponding correct outputs. To employ supervised learning, the machine learning module 207 may store a labeled dataset for learning, a dataset for testing and a final dataset from which the machine learning module 207 may use for applying classifications to the fields of the metadata and/or replacement methods to the identified PII of the data packages. During the training phase, the machine learning module 207 may learn the correct outputs by analyzing and describing well known data and information, that may be stored by pattern library 209, which may be part of the pseudonymizer 203 module, part of a separate data repository 215 stored by host system 201 or a network-accessible data repository.

The algorithm may learn by comparing the actual output with the correct outputs in order to find errors. The machine learning module 207 may modify the model of data according to the correct outputs to refine decision making, improving the accuracy of the automated decision making of the machine learning module 207 to provide the correct inputs (i.e. classifications). Examples of data modeling may include classification, regression, prediction and gradient boosting. Under a supervised learning technique, the machine learning module 207 may be trained using historical data, such as the data of pattern library 209 to predict the appropriate classification of the data and metadata with similar or the same data patterns. Embodiments of the machine learning module 207 may be continuously trained using updated versions of the pattern library 209 as user submissions describing PII-containing metadata fields, types of PII and replacement methods for scrubbing PII are added to the pattern library 209. In some embodiments, the pattern library 209 may be updated based on the level of confidence exhibited by the machine learning models that the patterns arising from user submissions or user annotations correctly identify PII-containing metadata fields, the type of PII identified within the field and/or replacement methods that may be suggested by the pattern library 209. Embodiments of the machine learning models and the pseudonymizer 203 may update the pattern library with additional data and metadata patterns when a level of confidence is reached above a particular threshold set by the pseudonymizer 203, host system 201 and/or administrator of host system 201.

For example, a confidence level of greater than 70%, greater than 85%, greater than 90%, greater than 95%, greater than 99%, etc. Additionally, user feedback and annotations to the classifications data and metadata outputted by the machine learning module 207 may modify the data model based on individual user feedback and annotations, and/or the collective feedback and annotations from a plurality of users pseudonymizing data with the pseudonymizer 203.

Unsupervised learning techniques may also be used by the machine learning module 207 when there may be a lack of historical data that may be available to teach the machine learning module 207 using labeled examples of classifications. Machine learning that is unsupervised may not be "told" the right answer the way supervised learning algorithms do. Instead, during unsupervised learning, the algorithm may explore the pattern library 209, user annotations and feedback data to find the patterns and commonalities between the proposed classifications being explored. Examples of unsupervised machine learning may include self-organizing maps, nearest-neighbor mapping, k-means clustering, and singular value decomposition.

Embodiments of machine learning module 207 may also incorporate semi-supervised learning techniques in some situations. Semi-supervised learning may be used for the same applications as supervised learning. However, instead of using entirely labeled training examples of data during the training phase, there may be a mix of labeled and unlabeled examples during the training phase. For example, there may be a small or limited amount of labeled data being used as examples (i.e., a limited number of historically identified column and key names and/or pattern data available to the machine learning module 207) alongside a larger amount of unlabeled data that may be presented to machine learning module 207 during the training phase. Suitable types of machine learning techniques that may use semi-supervised learning may include classification, regression and prediction models.

Embodiments of the machine learning module 207 may further perform functions or tasks associated with automated regex generation using one or more regular expression generators and deep learning models to create or refine user feedback and annotations identifying PII into a concise regex that captures the user's feedback and annotations. Allowing for the pseudonymizer to improve PII identification during future analysis of datasets. The concept of deep learning may refer to artificial intelligence (AI) functions that imitate how the human brain processes data and creates patterns for use in decision making. Deep learning may be a subset of machine learning, where computer networks are capable of learning unsupervised from data that is unstructured and unlabeled. Deep learning may also be referred to as deep neural learning or a deep neural network. Deep learning models of the machine learning module 207 may be specialized to process a set of inputs (i.e. user annotations and feedback for identifying PII) and regular expressions generated therefrom by one or more regular expression generators, to arrive at a cognitively generated output comprising one or more regular expressions for concisely identifying PII within a dataset and/or across a data package. An ensemble of deep learning models may, in some embodiments refine the regular expressions generated by the regular expression generators, into a single regular expression that best captures PII embodied by the user annotations. Deep learning models may be a classifier-type neural network or may be part of a larger neural network. For example, deep learning models of the machine learning module 207 may be nested within a single larger neural network connected to several neural networks or connected to other neural networks as an overall aggregate neural network.

Embodiments of the pseudonymizer may comprise a reporting engine 211. The reporting engine 211 may be responsible for facilitating communication between the pseudonymizer 203 and the pseudonymizer interface 237. The reporting engine 211 may provide reports describing one or more outputs from the components of the pseudonymizer 203. Embodiments of the reporting engine 211 may deliver requests for user approval or solicit amendments and feedback from the user in response to the output provided by the pseudonymizer 203. For example, the reporting engine 211 may request user approval, amendments or feedback in response to output of a configuration file from the pseudonymizer 203 classifying column names or key names; identifying PII within datasets; and/or ascribing one or more data replacement methods to the data values being scheduled for scrubbing. Moreover, reporting engine 211 may deliver reports to the user describing the final scrubbing of the data packages as part of the final output from the pseudonymizer 203.

In some embodiments of the computing environment 200, a knowledge base 213 may be provided or made available to track user activities using the pseudonymizer 203 and/or provide updates and/or recommendations to update pattern library 209 based on user approvals, annotations and feedback to pseudonymizer outputs. Since not all user responses, annotations and feedback will always apply in every situation to all users or even apply universally to all situations where the same user is using the pseudonymizer 203, the knowledge base 213 may track user activity and determine when repeated user activity may become normalized enough to incorporate user annotations and/or feedback into the pattern library. For example, multiple users consistently providing the same or similar annotations identifying PII within a dataset that is missed by the language processing module 205 because no such reference in the pattern library 209 to the type of PII exists. Knowledge base 213 can create records of the proposed annotations for identifying the PII and may eventually make a determination that an entry into the pattern library 209 describing the PII is warranted.

Embodiments of the knowledge base 213 may be a software application integrated into the pseudonymizer 203 or a standalone set of tools which may be stored within persistent storage 106 of the host system 201 and/or accessible remotely via network 250. The term "knowledge base 213" may refer to a human readable or machine-readable resource for disseminating and optimizing information collection, organization and retrieval. The knowledge base 213 may draw upon the knowledge of humans and artificial intelligence, that has been inputted into the knowledge base 213 in a machine-readable form and may be structured as a database. Embodiments of the knowledge base 213 may be used to find solutions to current and future problems by using the data inputted into the knowledge base 213 from past experiences to make informed decisions and/or recommendations to a user or administrator of the host system 201. Embodiments of the knowledge base 213 may not be simply a static collection of information. Rather, the knowledge base 213 may be a dynamic resource having the cognitive capacity for self-learning, using one or more data modeling techniques and/or by working in conjunction with one or more machine learning programs stored by the language processing module 205 and/or machine learning module 207 to improve pattern recognition of PII and the classifications of PII replacement methods or metadata fields. Embodiments of the knowledge base 213 may apply problem solving logic and use one or more problem solving methods to provide a justification for conclusions reached by the knowledge base 213 when recommending updates, additions or changes to the pattern library 209 or machine learning models.

The knowledge base 213, of the exemplary embodiment, may be a machine-readable knowledge base 213 that may receive, and store information inputted into the knowledge base 213 as one or more database records. The content of each database record may include information describing historical user annotations and feedback to the output of the pseudonymizer 203 including a description of the changes adopted by the pseudonymizer 203 as well as automatically generated regular expressions adopted by the pseudonymizer in response to user annotations and feedback. Embodiments of a knowledge base 213 may comprise a plurality of components to operate and make decisions to update pattern library 209. Embodiments of the knowledge base 213 may include components such as a fact database, rules engine, a reasoning engine, a justification mechanism and a knowledge acquisition mechanism. The facts database may contain the knowledge base's current fact pattern of a particular situation, which may comprise data describing a set of observations based on user annotations and feedback or a continuing pattern of similar annotations and feedback from users.

Embodiments of the rules engine of a knowledge base 213 may be a set of universally applicable rules that may be created based on the experience and knowledge of the practices of experts, developers, programmers and/or contributors to the knowledge base 213. The rules created by the rules engine may be generally articulated in the form of if-then statements or in a format that may be converted to an if-then statement. The rules of the knowledge base 213 may be fixed in such a manner that the rules may be relevant to all or nearly all situations covered by the knowledge base 213. While not all rules may be applicable to every situation being analyzed by the knowledge base 213, where a rule is applicable, the rule may be universally applicable.

Embodiments of the reasoning engine of the knowledge base 110 may provide a machine-based line of reasoning for solving problems, such as deciding when to integrate user annotations, feedback and/or automatically generated regular expressions into the pattern library 209. The reasoning engine may process the facts in the fact database and the rules of the knowledge base 213. In some embodiments of the knowledge base 213, the reasoning engine may also include an inference engine which may take existing information in the knowledge base 213 and the fact database, then use both sets of information to reach one or more conclusions and/or implement an action. Embodiments of the inference engine may derive new facts from the existing facts of the facts database using rules and principles of logic.

Embodiments of the justification mechanism of the knowledge base 213 may explain and/or justify how a conclusion by the knowledge base 213 was reached. The justification mechanism may describe the facts and rules that were used to reach the conclusion. Embodiments of the justification mechanism may be the result of processing the facts of a current situation in accordance with the entries of the knowledge base 213, the reasoning engine, the rules and the inferences drawn by the knowledge base 213. The knowledge acquisition mechanism of the knowledge base 213 may be performed by a manual creation of the rules, a machine-based process for generating rules or a combination thereof.

Figure 5C:
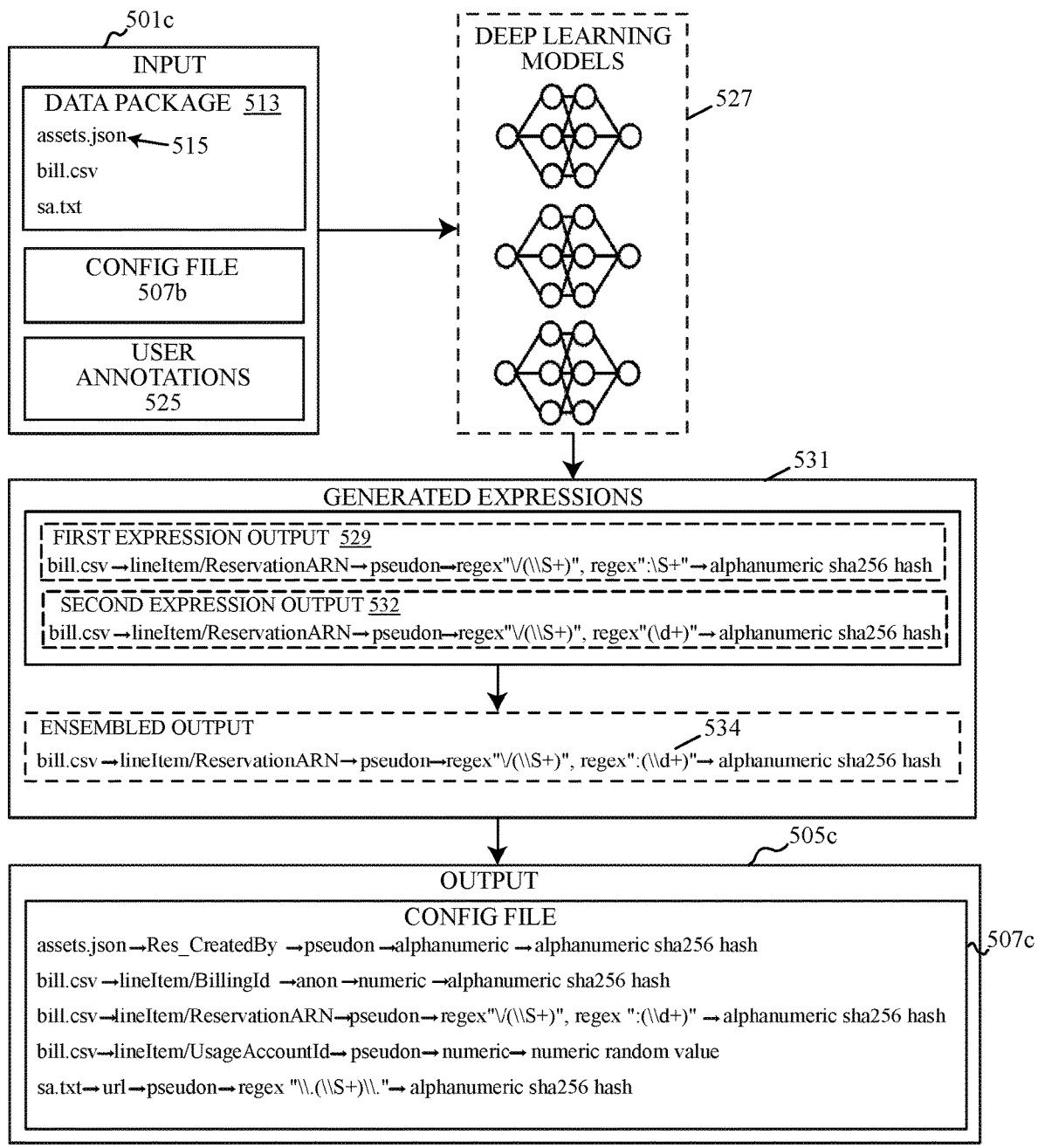
FIG. 5c depicts an embodiment of a workflow diagram illustrating automatic generation of one or more regular expressions using a deep learning models and combining the generated regular expressions into a single regular expression outputted to an updated configuration file.

Referring to the drawings, FIG. 5a-5c provide an exemplary embodiment of the individual stages and/or sub-processes for pseudonymizing data within computing environment 200, 260, 300. FIG. 5a, provides an example of a sub-process for classifying metadata within a data package into one or more classifications by the pseudonymizer 203. As shown in FIG. 5a, an input 501a is provided into pseudonymizer 203 comprising data package metadata 503. The data package metadata 503 inputted into the pseudonymizer 203 can be analyzed by the language processing module 205 and understood by parsing the fields described by the data package metadata 503 using language processor 261 or other known language processing techniques, known or described herein. As shown in the figures, the language processing module 205 may extract one or more features from the data package metadata 505, including the names of one or more columns or key names 509 and output 505a the columns or key names 509 being identified to a configuration file 507a. Based on the identified columns or key names 509 extracted from the data package metadata 503, the machine learning module 207 process the column or key names 509 using classification model assign a classification 511. In this example, the classification 511 may be "none" (indicating no expected PII, and thus not scrubbed), "anon" (indicating anonymize PII during scrubbing) or "pseudon" (indicating pseudonymize by scrubbing data values but mapping the raw data to the scrubbed values).

In some embodiments, the configuration file 507a outputted by the pseudonymizer 203 may be reviewed, approved and/or revised by the user. In such an embodiment, a user may approve the classifications 511 assigned to each of the column or key names 509. Based on the user's approval or applied changes, the configuration file 507a may be updated to reflect the user's changes accordingly. Moreover, user changes and feedback resulting in the updated configuration file 507a, may be fed back into the machine learning module 207 to retrain the model used to generate the classifications 511.

FIG. 5b provides an exemplary embodiment describing a sub-process for searching and identifying the type of PII 519 found within a dataset 515 of a data package 513 and assigning a replacement method 521 for scrubbing the data values classified for anonymization and/or pseudonymization. As shown in FIG. 5b, input 501b comprises a data package 513 which may include one or more datasets 515 being provided to the pseudonymizer 203 and configuration file 507a generated from the sub-process described in FIG. 5a. As shown in the drawings, the datasets 515 may include a plurality of different file types and/or data structures. For example, the datasets may be structured (.csv), semi-structured (.json) or unstructured (.txt) data. Using the configuration file 507a as a template for how to process the datasets 515, the pseudonymizer 203 may analyze the individual datasets 515 and identify the presence of types of PII that may be present within the columns or key names 509 classified with the classification 511 of anon or pseudon in the configuration file 507a.

Embodiments of the language processing module 205 filter the columns or key names 509 within the datasets 515 and match the columns or key names 509 of the datasets 515 to the classifications 511 labeled in the configuration file 507a as anon or pseudon. The language processing module 205 may parse the data values within the filtered columns or key names 509 and using the pattern library 209 as a reference to match similar types of PII data patterns, apply textual analytics to determine the types of PII 519 observed within the data values. Pseudonymizer 203 may output 505b a configuration file 507b describing the types of PII within the column or key names 509 which includes the types of PII 519 observed by the language processing module 205 that have been matched to the particular column or key name 509. For example, in some embodiments of FIG. 5b, the configuration file 507b describes the type of PII observed by the language processing module 205 using an identifier such as "alphanumeric" or "numeric", which indicate that within the particular column or key name 509, PII can be identified by searching for an alphanumeric or numeric string amongst the data values. For example, a column or key name 509 labeled as "UsageAccountID" may container PII disclosing account numbers. For instance, if the data values are credit card numbers or bank account numbers, the type of PII 519 may be identified as numeric, indicating the account numbers within the data values that may be PII can be found by searching for a string of numbers. Alternatively, "UsageAccountID" may be a combination of letters and numbers and therefore identified as corresponding to an alphanumeric type of PII, since only numeric strings may not be sufficient to search and find PII within the datasets 515 where a combination of numbers and letters are used for the account's ID.

In some embodiments, simplified identifiers such as numeric or alphanumeric may be insufficient for concisely identifying the type of PII 519 stored within the datasets 515. Instead, the type of PII stored within the datasets 515 may be described in the configuration file 507b using a regular expression 523. For example, as shown in FIG. 5b the column or key name 509 for "lineItem/ReservationARN" may comprise a data value resembling the following: "arn:735363466628:ris/ed0wzw-rp-8bilo-ip4pyxsd-6chsnsv". Data patterns stored by the pattern library 209 may indicate that the string "arn:735363466628:ris/ed0wzw-rp-8bilo-ip4pyxsd-6chsnsv" indicates a server Id, but the entire string may not be considered PII according to the pattern library 209. Rather, a portion of the string "ed0wzw-rp-8bilo-ip4pyxsd-6chsnsv" may be a unique combination of characters within the string known to contain PII, while anonymizing or pseudonymizing the first portion of the "arn:735363466628:ris" may render the data value useless. Accordingly, based on the known data patterns of the pattern library 209, a regular expression may be outputted to configuration file 507b which may narrow the identification of the PII within the column or key name 509 to the portion of the string that comprises the PII. In this example, concisely identifying the PII of string "ed0wzw-rp-8bilo-ip4pyxsd-6chsnsv" while ignoring the non-PII containing portion "arn:735363466628:ris". Accordingly, as shown in the example of configuration file 507b, the language processing module 205 in view of the pattern library 209 references for similar data patterns may generate a regular expression regex "\/(\\S+)" which may concisely identify the unique portion of the server id (i.e. the "ed0wzw-rp-8bilo-ip4pyxsd-6chsnsv" portion) as the PII to be scrubbed, without scrubbing the entire server id which partially contains non-PII data.

Furthermore, in the sub-process described in FIG. 5b, for each of the types of PII 519 identified within the datasets 515, the machine learning module 207 of the pseudonymizer 203 may determine and assign a replacement method 521 for the type of PII 519 identified within configuration file 507b. The replacement method may concisely scrub the PII-containing within the dataset 515, without inadvertently scrubbing non-PII data by using the type of PII 519 identified within the configuration file 507b as a blueprint for pinpointing the PII of the data value. For example, by replacing the underlined PII-containing data values of "arn: 735363466628:ris/ed0wzw-rp-8bilo-ip4pyxsd-6chsnsv" identified in lineItem/ReservationARN with an alphanumeric sha256 hash replacement method as shown in configuration file 507b or a random numeric value for replacing the numerals of the UsageAccountID identified as PII. Replacement methods 521 may be determined using a machine learning model and the pattern library 209 as a reference. The replacement method 521 assigned to the type of PII 519 may be selected based on corresponding known or acceptable methods described by the pattern library 209 for scrubbing the type of PII 519 within the dataset.

Embodiments of the pseudonymizer 203 may maintain consistency between similar data values of the data package 513 by mapping the same data values discovered across multiple datasets 515 within the data package 513 to the same scrubbed value. For instance, where identified PII within a column name or key name is the same in multiple locations of a dataset 515 or between datasets 515, the pseudonymizer 203 will not only apply the same replacement method 521, but the output from the replacement method 521 will be consistent. For example, where an identical numeric value for a user account id is identified across the data package and the replacement method 521 is to generate a random numeric value to replace the numerical value of the user account id, the pseudonymizer 203 may generate the same random numeric value consistently for the same user account id, everywhere the account id is present in the data package 513.

Embodiments of the sub-process depicted in FIG. 5b may further provide for user feedback and user input in the form of user annotations 525. As shown in the example, a user may amend the configuration file 507b with one or more amendments, changes, feedback, etc., to the types of PII 519 identified and/or the replacement method 521 assigned to the identified PII. For instance, if a user disagreed with how to locate the PII within a data value, the user may input another possible way to identify the PII. Such an addition may be useful where the data patterns of the data library 209 may not account for all the variations in the types of PII that may be present and/or user's requesting the scrubbing of the datasets may consider the presence of certain values to contain PII wherein the pattern library 209 may not. Using the lineItem/ReservationARN as an example, the pattern library 209 may indicate that the underlined portion of "arn:735363466628:ris/ed0wzw-rp-8bilo-ip4pyxsd-6chsnsv" is considered PII and thus identifies the type of PII 519 using the regex "\/(\\S+)". However, a user viewing the configuration file 507b also considers the underlined numerical portion of "arn:735363466628:ris/ed0wzw-rp-8bilo-ip4pyxsd-6chsnsv" to comprise PII and thus annotates the type of PII to further include "numeric" types of PII 519. Embodiments of the pseudonymizer 203 may use the feedback provided in the user annotations 525 to further train the machine learning models, but may also automatically generate one or more regular expressions that incorporate the user annotations 525 into the regular expression in order to avoid potentially missing one or more types of PII 519 that a user may consider necessary to scrub.

The embodiment of sub-process described in FIG. 5c exemplifies the automatic generation of one or more regular expressions based on one or more user annotations 525 provided to pseudonymizer 203 during the sub-process of FIG. 5b. As shown in FIG. 5c, input 501c comprising data package 513, configuration file 507b and the user annotations 525 may be provided to one or more deep learning models 527. In the exemplary embodiment, at least two different deep learning models 527 may be used to generate one or more regular expressions 523. In some embodiments, the deep learning models 527 may be part of the machine learning module 207 and in other embodiments, the deep learning models 527 may be separate from the machine learning module 207 and/or pseudonymizer 203. The deep learning models may use the user annotations 525 to create a plurality of generated expressions 531. For example, in the exemplary embodiment of FIG. 5c, the generated expressions 531 comprises at least a first expression output 529 and a second expression output 532.

The number of regular expressions 523 outputted by the deep learning models 527 may vary depending on the number of different deep learning models 527 analyzing the user annotations 525. While there may be some identical expressions generated expressions one or more generated expressions 531 may be different from one another and provide variations on how to identify PII within the data values and/or encompass overlapping scope for identifying types of PII 519. As shown in FIG. 5c, the first expression output 529 and the second expression output 532 provide different regular expressions for identifying types of PII 519 that are present within the same column or key names 509. In this particular example, the first expression output 529 arrives at a regular expression defined as regex ":\S+" while the second expression output 532 outputs a regular expression defined as regex ":(\\d+).

In embodiments where a plurality of generated expressions 531 are outputted by deep learning models 527, the generated expressions 531 may be consolidated into a new regular expression 534 encompassing the scope of one or more generated expressions 531. For example, the first expression output 529 comprising a first regular expression and a second expression output comprising a second expression output 532 may be combined into an ensembled output comprising the new regular expression 534 written as regex ":(\\d+)". Embodiments of pseudonymizer 203 may generate output 505c an updated configuration file 507c comprising the new regular expression 534 automatically generated by the deep learning models 527. Configuration file 507c may be reported to the user and approved, or further revised or annotated by the user. Where the user approves the incorporation of the automatically generated new regular expression 534 into the configuration file 507c, the pseudonymizer 203 may perform pseudonymizing operations using the configuration file 507c as a template for performing pseudonymization of the data package 513. In some embodiments, users may provide additional feedback, revisions and/or user annotations 525 to the configuration file 507c comprising the new regular expression 534. The additional feedback, revisions or annotations may be used to further train the regular expression generation of the deep learning models 527.

In some embodiments, the pseudonymizer 203 may detect one or more anomalies as a result of the automatically generated new regular expression 534 inserted into the configuration file 507c. Anomalies may occur where the new regular expression 534 works to identify PII on most of the data values within the column or key names 509, but not all of the column or key names 509. Anomaly detection may be applied to determine if any data values show a statistically significant deviation from the new regular expression 534 automatically generated by the deep learning models 527. If a statistically significant deviation is identified, the pseudonymizer 203 may request the user to add more annotations for the data values where anomalies are identified and retraining of the deep learning models 527 may be performed as a function of the revised user annotations.

Figure 2C:
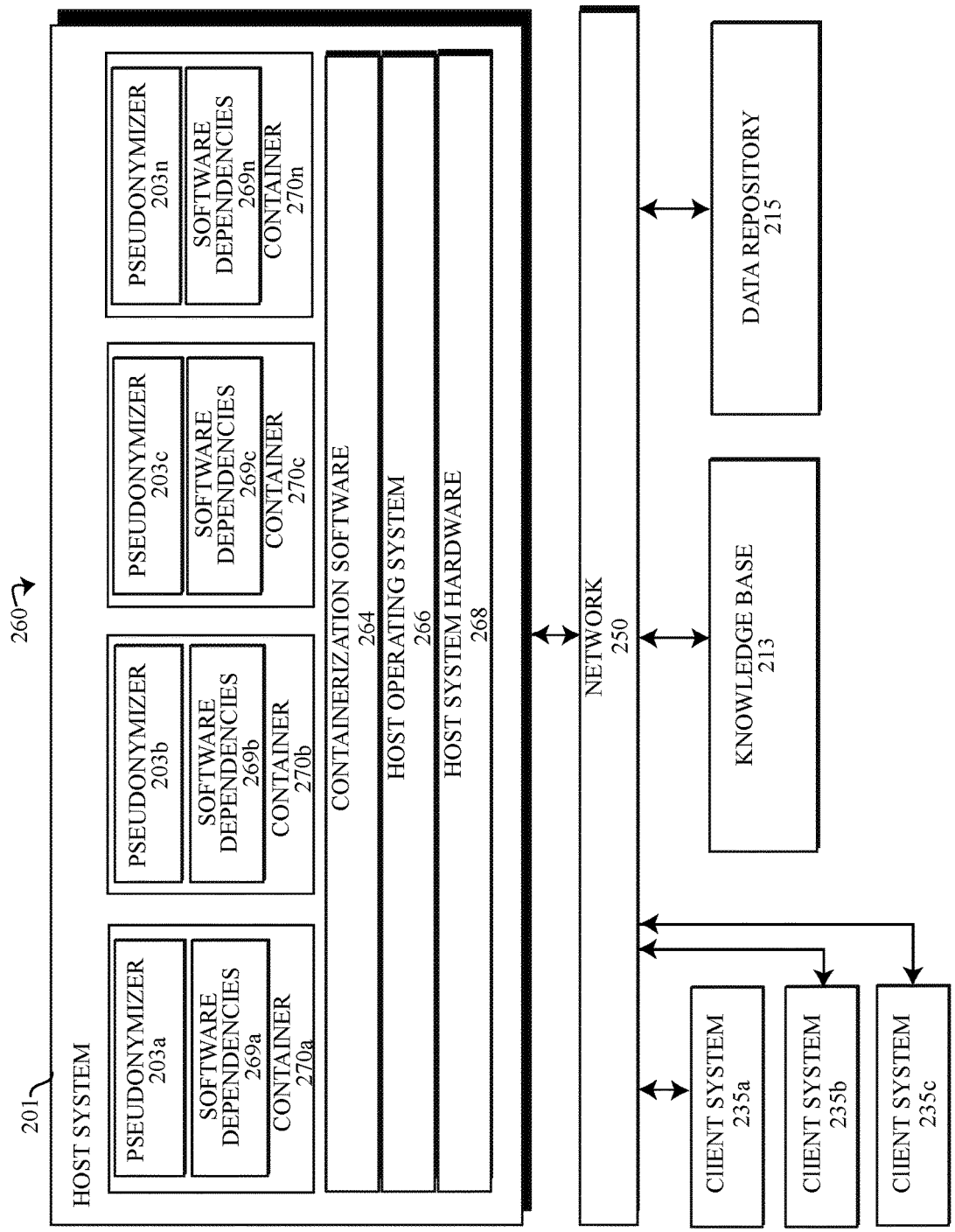
FIG. 2c depicts an alternate embodiment of a containerized computing environment for pseudonymizing data in accordance with the present disclosure.

Referring to the drawings, FIG. 2c depicts an alternative embodiment, comprising containerized computing environment 260, wherein host system 201 may containerize one or more pseudonymizer 203 applications being accessed by the client systems 235 into multiple separate containerized environments of a container cluster (depicted as containers 270a-270n). Embodiments of the host system 201 may manage virtual memory operations via a host operating system 266 for the containerized applications being deployed and hosted by the host system 201 in a manner consistent with this disclosure. Embodiments of the containers 270 comprise an application image of the pseudonymizer 203a-203n, and the software dependencies 269a-269n, within the container's 270 operating environment. The host system 201 may run a multi-user operating system (i.e. the host operating system 266) and provide computing resources via the host system hardware 268 to the one or more containers 270a-27n (referred to generally as containers 270) comprising the containerized computer environment 260 for executing and performing functions of pseudonymizer 203.

Embodiments of computing environment 260 may be organized into a plurality of data centers that may span multiple networks, domains, and/or geolocations. The data centers may reside at physical locations in some embodiments, while in other embodiments, the data centers may comprise a plurality of host systems 201 distributed across a cloud network and/or a combination of physically localized and distributed host systems 201. Data centers may include one or more host system 201, providing host system hardware 268, a host operating system 266 and/or containerization software 264 such as, but not limited to, the open-source Docker and/or OpenShift software, to execute and run the containerized application images of the pseudonymizer 203 encapsulated within the environment of the containers 270, as shown in FIG. 2c. Although the exemplary embodiment depicted in FIG. 2c includes four containers 270, the embodiment of FIG. 2c is merely illustrative of the concept that a plurality of containers 270 can be hosted and managed by a host system 201. The embodiment of FIG. 2c should in no way be considered to imply that the host systems 201 is limited to hosting only four containers 270. The number of containers 270 hosted and managed by a host system 201 may vary depending on the amount of computing resources available, based on the host system hardware 268 and the amount of computing resources required by application images being executed within the containers 270 by the containerization software 264.

Embodiments of the containerization software 264 may operate as a software platform for developing, delivering, and running containerized programs and applications, as well as allowing for the deployment of code quickly within the computing environment of the containers 270. Embodiments of containers 270 can be transferred between host systems 201 as well as between different data centers that may be operating in different geolocations, allowing for the containers 270 to run on any host system 201 running containerization software 264. The containerization software 264 enables the host system 201 to separate the containerized applications and programs from the host system hardware 268 and other infrastructure of the host system 201 and manage pseudonymization operations for containerized applications being run and executed on the host system 201 via the host system's operating system 266.

The containerization software 264 provides host system 201 with the ability to package and run application images such as pseudonymizer 203 within the isolated environment of the container 270. Isolation and security provided by individual containers 270 may allow the host system 201 to run multiple instances of the pseudonymizer 203 while simultaneously managing pseudonymization of data packages for all of the application images on a single host system 201. A container 270 may be lightweight due to the elimination of any need for a hypervisor, typically used by virtual machines. Rather, the containers 270 can run directly within the kernel of the host operating system 266. However, embodiments of the application images may benefit from combining virtualization of virtual machines with containerization. For example, the host system 201 may be a virtual machine running containerization software 264.

Embodiments of the containerization software 264 may comprise a containerization engine (not shown). The containerization engine may be a client-server application which may comprise a server program running a daemon process, a REST API specifying one or more interfaces that the applications and/or other programs may use to talk to the daemon process and provide instructions to the application image, as well as a command-line interface (CLI) client for inputting instructions. In one embodiment, the client system 235 may input commands using a CLI to communicate with the containerization software 264 of the host system 201. In the exemplary embodiment depicted in FIG. 2c, commands provided by the client system 235 to the host system 201 may be input via the pseudonymizer interface 237 loaded into the memory 105 or persistent storage 106 of the client system 235 interfacing with the host system 201.

Embodiments of the CLI may use the REST API of the containerization engine to control or interact with the daemon through automated scripting or via direct CLI commands. In response to the instructions received from the CLI, via the REST API, the daemon may create and manage the containerization software 264, including one or more software images residing within the containers 270, the containers 270 themselves, networks, data volumes, plugins, etc. An image may be a read-only template with instructions for creating a container 270 and may be customizable. Containers 270 may be a runnable instance of the software image. Containers 270 can be created, started, stopped, moved or deleted using a containerization software 264 API or via the CLI. Containers 270 can be connected to one or more networks 250, can be attached to a storage device and/or create a new image based on the current state of a container 270.

Method for Pseudonymizing Data

Figure 6A:
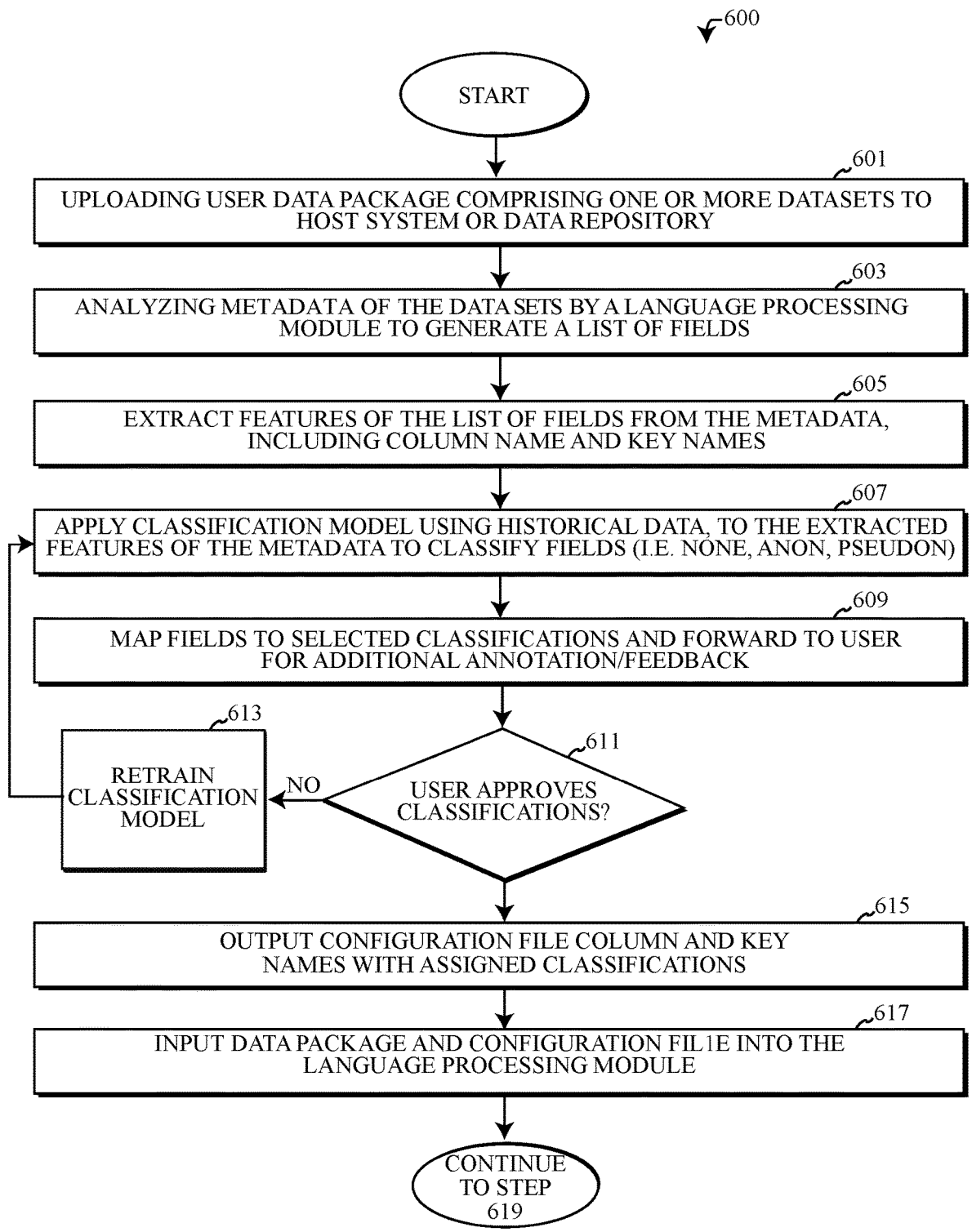
FIG. 6a depicts an embodiment of an algorithm implementing a computerized method for pseudonymizing data in accordance with the present disclosure.
Figure 6B:
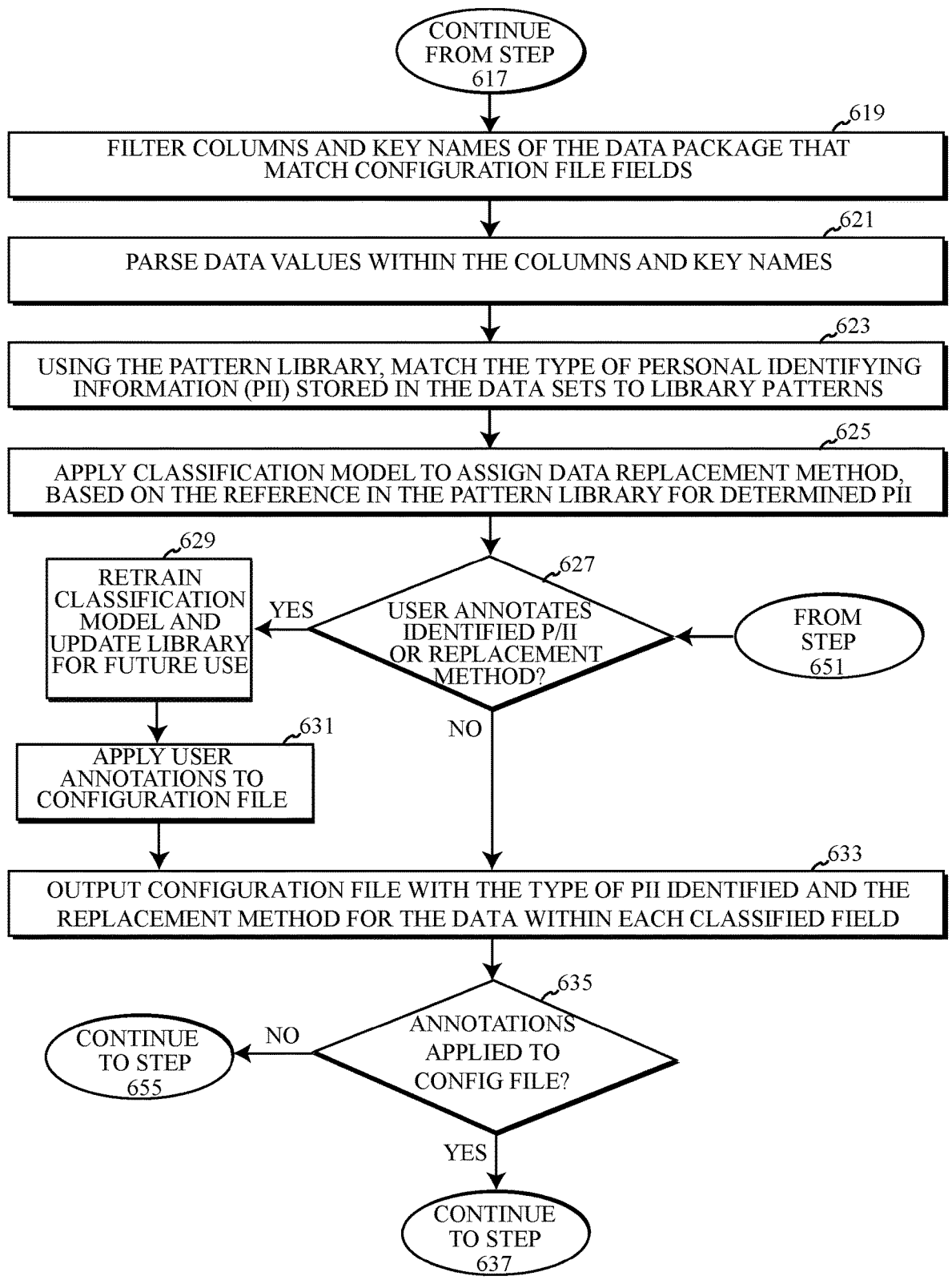
FIG. 6b depicts a continuation of the algorithm of FIG. 6a implementing a computerized method for pseudonymizing data in accordance with the present disclosure.
Figure 6C:
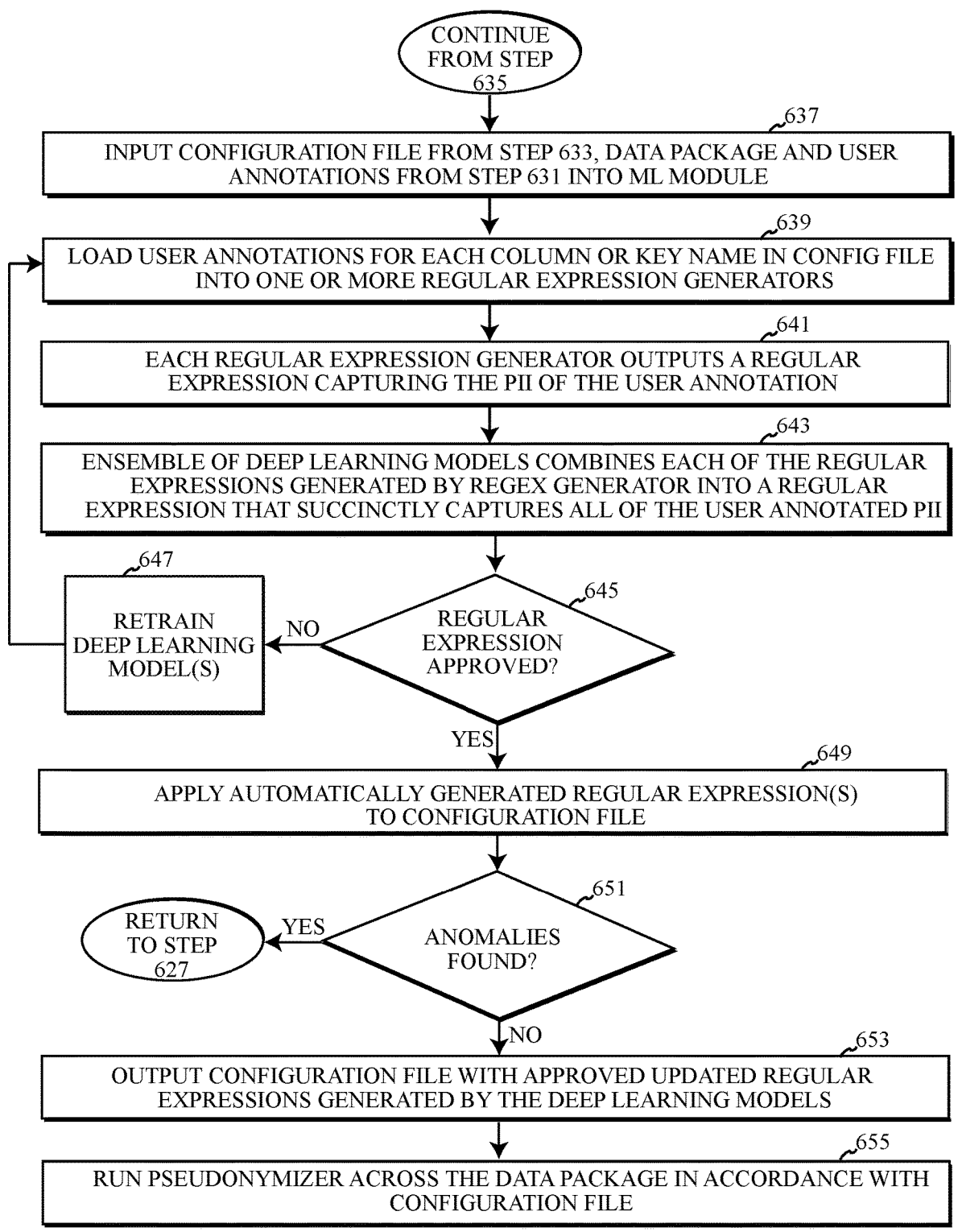
FIG. 6c depicts a continuation of the algorithm of FIG. 6a-6b implementing a computerized method for pseudonymizing data in accordance with the present disclosure.

The drawings of FIGS. 6a-6c represent an embodiment of an algorithm 600 performing a computer-implemented method for pseudonymizing data using natural language processing, crowdsourced data patterns, machine learning and/or deep learning algorithms. The algorithm 600, as shown and described by FIGS. 6a-6c, may use one or more computer systems, defined generically by data processing system 100 of FIG. 1, and more specifically by the embodiments of specialized data processing systems depicted in FIGS. 2a-5c as described herein. A person skilled in the art should recognize that the steps of the algorithm 600 described in FIGS. 6a-6c may be performed in a different order than presented. The algorithm 600 may not necessarily require all the steps described herein to be performed. Rather, some embodiments of algorithm 800 may alter the methods by performing a subset of steps using one or more of the steps discussed below.

Embodiments of the algorithm 600 may begin at step 601. In step 601, a user operating a client system 235 may upload a data package 513 comprising one or more datasets 515 and/or accompanying metadata of the datasets 515 to a host system 201 and/or a separate data repository 215, which may be remotely accessible to the client system 235 and host system 201. In step 603, the metadata describing the datasets 515 may be analyzed by a language processing module 205 to generate a list of fields described by the metadata, including one or more column names or key names that may be present. During the analysis of the metadata, language processing module 205 may break down the text of the fields within the metadata into meaningful characters, words, and other meaningful elements for understanding the meaning of the text describing the fields.

In step 605 of the algorithm 600, the language processing module 205 may load the processed text of the metadata into a data model and extract features of the list of fields described by the metadata, including column names and key names that may be present within the metadata. In step 607 of the algorithm 600, the machine learning module 207 may apply a machine learning model, such as a classification model, to the columns or key names extracted from the metadata. Embodiments of the machine learning module 207 may use the classification model trained with historical data for understanding data and PII data values that may be known to be present within the columns or key names to assign a classification to each column or key name. For Example, the machine learning module 207 may apply classification such as "none", "anon" and "pseudon" to the columns and key names.

In step 609 of algorithm 600, the machine learning module 207 may map the columns or key names of the assigned classifications in step 607 to classifications and forward the proposed classifications to a user for approval or additional annotation and feedback. In step 611, a determination is made whether a user approves the classifications assigned by the machine learning module 207 to each of the columns or key names of the metadata. If the user does not approve of the classification mappings of the columns or key names, the algorithm 600 may proceed to step 613, wherein the classification model of the machine learning module 207 can be retrained to account for the user's feedback and/or disapproval of the classifications then return to step 607 to re-determine classifications using the retrained model. Conversely, if in step 611, the user approves of the classification mappings to the columns or key names, the algorithm 600 may proceed to step 615.

In step 615 of the algorithm 600, the reporting engine 211 may output a configuration file 507*a* comprising the column or key names 509 describing the metadata fields of the datasets 515 and the classification 511 assigned to the column or key name 509. In step 617, the configuration file 507*a* outputted in step 615 may be inputted into the language processing module 205 along with datasets 515 of data package 513. In step 619 of the algorithm 600, the language processing module 205 may filter the columns and key names that match the columns or key names 509 described by the configuration file 507*a* which have been assigned classifications indicating data values should to be scrubbed, such as "anon" and "pseudon".

In step 621, the language processing module 205 may parse the data values within the columns or key names 509 filtered in step 619 using textual analytics and other processing techniques described herein to identify and understand the data values that may be within the columns or key names 509. Using the parsing information of step 619, in step 623, the language processing module 205 may match data patterns described by a pattern library 209 to the parsed data in order to recognize and identify the type of PII 519 that is stored within the parsed data values of each column or key name 509. The type of PII 519 may be recognized as the entire string of data within the column or key name 509 or may only be a portion or subset of the data value. Examples of the type of PII 519 data patterns may include identifiers such as alphanumeric, numeric and/or be described using a regular expression to pinpoint the PII within the data values of the column or key name 509. In step 625, the machine learning module 207 may apply a classification model using the pattern library 209 and the type of PII 519 identified in step 623 to assign a data replacement method 521 for scrubbing the data values comprising PII and replacing the data with non-PII that may be mapped to the original data value. Embodiments of the reporting engine 211 may present to the user the types of PII 519 identified by the language processing module 205 and the replacement methods 521 being mapped to the PII of the column or key name. Users may approve, annotate and/or provide feedback to the proposed identified types of PII 519 and replacement methods 521 determined by the pseudonymizer 203.

In step 627 of the algorithm 600, a determination is made whether or not a user has annotated the type of PII 519 identified by the language processing module 205 and/or proposes changes to the replacement method 521 for scrubbing the PII found within one or more columns or key names 509. If the user has not made amendments or annotations to the type of PII 519 or the replacement method 521, the algorithm may proceed to step 633 and a configuration file 507*b* may be outputted comprising the name of the dataset (s) 515, the column or key name 509 identified, a classification 511 for the data within the column or key name 509, a type of PII 519 identified and a replacement method 521 for scrubbing the PII of the data values within the column or key name 509.

Conversely, if in step 627, the determination is made that the user has provided user annotations 525, or feedback to the type of PII 519 or the replacement method 521 assigned to the column or key name 509, the algorithm 600 may proceed to step 629 and retrain the classification model and/or update the pattern library 209 for future uses. In some embodiments, the algorithm 600 may proceed to step 631 and apply the user annotations and output the configuration file 507*b* as described above in step 633 to the outputted configuration file 507*b*.

In step 635, the algorithm may determine whether or not the configuration file 507*b* comprises one or more annotations suggested by the user. If, in step 635, it is determined that the configuration file 507*b* does not include any annotations by the user and that the user approved the types of PII 519 and the replacement methods 521 without any annotations or feedback, the algorithm 600 may proceed to step 655 and run the pseudonymization of the datasets 515 across the data package 513 in accordance with the template for performing pseudonymization provided by the configuration file 507*b*. Likewise, if in step 635 a determination is made that the configuration file 507*b* comprises one or more user annotations, the algorithm 600 may proceed to step 637.

In step 637 of algorithm 600, the data package 513, user annotations 525 and configuration file 507*b* are inputted into the machine learning module 207. In step 639, the machine learning module 207 loads the user annotations from step 631 into one or more deep learning models 527 such as one or more regular expression generators configured to automatically generate one or more regular expressions 523 capturing the user's annotation within the generated regular expression. In step 641, the regular expression generators of the deep learning models 527 generates a regular expression capturing PII identified by the user annotations. Where two or more different regular expressions are generated by the regular expression generators of the deep learning models 527, the deep learning model and/or the machine learning module 207 may, in step 643 use an ensemble of deep learning models 527 to create a single new regular expression from the plurality of regular expressions that best captures the users annotations for a particular column or key name 509. The reporting engine 211 may present the new regular expression to the user for user approval. In step 645, a determination is made whether the user approves of the automatically generated regular expression(s). If approval from the user is not received, the algorithm may proceed to step 647 and retrain the deep learning models 527 based on additional user feedback and/or annotations of the generated regular expression(s). Conversely, where the automatically generated regular expression(s) presented to the user are approved, newly generated regular expression(s) encompassing the user's annotations may be applied to configuration file 507*b*.

In some embodiments of algorithm 600, the pseudonymizer 203 may check for the occurrence of anomalies based on the inclusion of the newly generated regular expressions created in step 643. If an anomaly is found, the algorithm may proceed back to step 627 for further annotations and feedback from the user to correct identified PII or replacement method for the column or key names where such anomalies have been identified. However, if in step 651, anomalies are not found, the algorithm may proceed to step 653, wherein a configuration file 507*c* is outputted with the approved new regular expression that has been automatically generated, integrated into the configuration file 507*c*. The algorithm may proceed to step 655 and run pseudonymizer 203 across the entire data package in accordance with the configuration file 507*c* generated in step 653, as a template for performing the pseudonymization.

What is claimed is:

1. A computer-implemented method comprising:
    analyzing, by a processor, metadata of a data package comprising personal identifying information;
    extracting, by the processor, column names or key names from the metadata;
    mapping, by the processor, the column names or the key names, to a classification indicating whether data values associated with the column names or the key names are configured to be unprocessed, anonymized or pseudonymized during processing of the data values;
    outputting, by the processor, a configuration file instructing a pseudonymizer to pseudonymize the data values associated with the column names or the key names classified to be pseudonymized;
    parsing, by the processor, the data values associated with the column names or the key names configured to be pseudonymized;
    matching, by the processor, a personal identifying information pattern stored by a pattern library to personal identifying information stored within the data values configured to be pseudonymized;
    mapping, by the processor, a replacement method to the personal identifying information stored in the data values using a classification model and the personal identifying information pattern as a reference to map the replacement method; and
    updating, by the processor, the configuration file to include the personal identifying information pattern for recognizing the personal identifying information associated with the column names or the key names and the replacement method for pseudonymizing the data values identified as the personal identifying information consistently across all datasets of the data package.

2. The computer-implemented method of claim 1, further comprising:
    receiving, by the processor, user feedback amending the classification of one or more column name or key name;
    retraining, by the processor, a classification model as a function of the user feedback; and
    outputting, by the processor, a revised configuration file adopting amendments to the classification of the one or more column name or key name.

3. The computer-implemented method of claim 1, wherein the personal identifying information pattern of the pattern library for matching the data values to personal identifying information is a regular expression.

4. The computer-implemented method of claim 1, wherein the pattern library is generated by crowdsourcing user-submitted patterns for identifying one or more types of personal identifying information from a plurality of users.

5. The computer-implemented method of claim 1, further comprising:
    receiving, by the processor, user annotations modifying the personal identifying information identified by the configuration file;
    loading, by the processor, user-annotated personal identifying information into a plurality of regular expression generators;
    generating, by the processor, a regular expression by each of the regular expression generators, wherein at least two different regular expressions are outputted by the regular expression generators that capture user-annotated personal identifying information from the data package;
    generating, by the processor, a new regular expression using an ensemble of deep learning models based on the at least two different regular expressions, wherein said new regular expression captures the user-annotated personal identifying information stored within the column names or the key names of the data package of the at least two different regular expressions using a single regular expression;
    updating, by the processor, the configuration file to further comprise the new regular expression; and
    pseudonymizing, by the processor, the data values of each column name and key name consistently across the data package, in accordance with instructions provided by the configuration file.

6. The computer-implemented method of claim 5, further comprising:
    modifying, by the processor, the pattern library by adding the new regular expression associated with the user-annotated personal identifying information.

7. A computer system comprising:
    a processor; and
    a computer-readable storage media coupled to the processor, wherein the computer-readable storage media contains program instructions executing a computer-implemented method comprising:
        analyzing, by the processor, metadata of a data package comprising personal identifying information;
        extracting, by the processor, column names or key names from the metadata;
        mapping, by the processor, the column names or the key names, to a classification indicating whether data values associated with the column names or the key names are configured to be unprocessed, anonymized or pseudonymized during processing of the data values;

outputting, by the processor, a configuration file instructing a pseudonymizer to pseudonymize the data values associated with the column names or the key names classified to be pseudonymized;

parsing, by the processor, the data values associated with the column names or the key names configured to be pseudonymized;

matching, by the processor, a personal identifying information pattern stored by a pattern library to personal identifying information stored within the data values configured to be pseudonymized;

mapping, by the processor, a replacement method to the personal identifying information stored in the data values using a classification model and the personal identifying information pattern as a reference to map the replacement method; and updating, by the processor, the configuration file to include the personal identifying information pattern for recognizing the personal identifying information associated with the column names or the key names and the replacement method for pseudonymizing the data values identified as the personal identifying information consistently across all datasets of the data package.

8. The computer system of claim 7, further comprising:
receiving, by the processor, user feedback amending the classification of one or more column name or key name;
retraining, by the processor, a classification model as a function of the user feedback; and
outputting, by the processor, a revised configuration file adopting amendments to the classification of the one or more column name or key name.

9. The computer system of claim 7, wherein the personal identifying information pattern of the pattern library for matching the data values to personal identifying information is a regular expression.

10. The computer system of claim 7, wherein the pattern library is generated by crowdsourcing user-submitted patterns for identifying one or more types of personal identifying information from a plurality of users.

11. The computer system of claim 7, further comprising:
receiving, by the processor, user annotations modifying the personal identifying information identified by the configuration file;
loading, by the processor, user-annotated personal identifying information into a plurality of regular expression generators;
generating, by the processor, a regular expression by each of the regular expression generators, wherein at least two different regular expressions are outputted by the regular expression generators that capture user-annotated personal identifying information from the data package;
generating, by the processor, a new regular expression using an ensemble of deep learning models based on the at least two different regular expressions, wherein said new regular expression captures the user-annotated personal identifying information stored within the column names or the key names of the data package of the at least two different regular expressions using a single regular expression;

updating, by the processor, the configuration file to further comprise the new regular expression; and pseudonymizing, by the processor, the data values of each column name and key name consistently across the data package, in accordance with instructions provided by the configuration file.

12. The computer system of claim 11, further comprising:
modifying, by the processor, the pattern library by adding the new regular expression associated with the user-annotated personal identifying information.

13. A computer program product comprising:
one or more computer-readable storage media having computer-readable program instructions stored on the one or more computer-readable storage media said program instructions executes a computer-implemented method comprising the steps of:

analyzing, by a processor, metadata of a data package comprising personal identifying information;

extracting, by the processor, column names or key names from the metadata;

mapping, by the processor, the column names or the key names, to a classification indicating whether data values associated with the column names or the key names are configured to be unprocessed, anonymized or pseudonymized during processing of the data values;

outputting, by the processor, a configuration file instructing a pseudonymizer to pseudonymize the data values associated with the column names or the key names classified to be pseudonymized;

parsing, by the processor, the data values associated with the column names or the key names configured to be pseudonymized;

matching, by the processor, a personal identifying information pattern stored by a pattern library to personal identifying information stored within the data values configured to be pseudonymized;

mapping, by the processor, a replacement method to the personal identifying information stored in the data values using a classification model and the personal identifying information pattern as a reference to map the replacement method; and updating, by the processor, the configuration file to include the personal identifying information pattern for recognizing the personal identifying information associated with the column names or the key names and the replacement method for pseudonymizing the data values identified as the personal identifying information consistently across all datasets of the data package.

14. The computer program product of claim 13, further comprising:
receiving, by the processor, user feedback amending the classification of one or more column name or key name;
retraining, by the processor, a classification model as a function of the user feedback; and
outputting, by the processor, a revised configuration file adopting amendments to the classification of the one or more column name or key name.

15. The computer program product of claim 13, wherein the pattern library is generated by crowdsourcing user-submitted patterns for identifying one or more types of personal identifying information from a plurality of users.

16. The computer program product of claim 13, further comprising:

receiving, by the processor, user annotations modifying the personal identifying information identified by the configuration file;

loading, by the processor, user-annotated personal identifying information into a plurality of regular expression generators;

generating, by the processor, a regular expression by each of the regular expression generators, wherein at least two different regular expressions are outputted by the regular expression generators that capture user-annotated personal identifying information from the data package;

generating, by the processor, a new regular expression using an ensemble of deep learning models based on the at least two different regular expressions, wherein said new regular expression captures the user-annotated personal identifying information stored within the column names or the key names of the data package of the at least two different regular expressions using a single regular expression;

updating, by the processor, the configuration file to further comprise the new regular expression; and pseudonymizing, by the processor, the data values of each column name and key name consistently across the data package, in accordance with instructions provided by the configuration file.

17. The computer program product of claim 16, further comprising:

modifying, by the processor, the pattern library by adding the new regular expression associated with the user-annotated personal identifying information.

* * * * *